United States Patent
Yasuda et al.

(10) Patent No.: US 7,343,073 B2
(45) Date of Patent: Mar. 11, 2008

(54) OPTICAL MEMBERS AND COMPOSITIONS FOR PRODUCING THEM

(75) Inventors: Takayasu Yasuda, Kanagawa (JP); Hiroki Sasaki, Kanagawa (JP); Ryoichi Nemori, Kanagawa (JP); Yuuichi Okamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 168 days.

(21) Appl. No.: 10/531,704

(22) PCT Filed: Nov. 14, 2003

(86) PCT No.: PCT/JP03/14510

§ 371 (c)(1),
(2), (4) Date: Oct. 28, 2005

(87) PCT Pub. No.: WO2004/046203

PCT Pub. Date: Jun. 3, 2004

(65) Prior Publication Data

US 2006/0056786 A1    Mar. 16, 2006

(30) Foreign Application Priority Data

Nov. 15, 2002 (JP) ............................. 2002-331857
Nov. 29, 2002 (JP) ............................. 2002-348126

(51) Int. Cl.
*G02B 6/028* (2006.01)
(52) U.S. Cl. ..................................... 385/124
(58) Field of Classification Search ................ 385/124, 385/141–143
See application file for complete search history.

(56) References Cited

U.S. PATENT DOCUMENTS 5,541,247 A * 7/1996 Koike ........................ 524/285
5,663,264 A * 9/1997 Kawai et al. ............... 526/320

FOREIGN PATENT DOCUMENTS

DE    33 11 872 A    10/1983
EP    0 566 744 A    10/1993

* cited by examiner

*Primary Examiner*—Sarah Song
(74) *Attorney, Agent, or Firm*—Sughrue Mion, PLLC

(57) ABSTRACT

It is disclosed a polymerizable composition for producing an optical member for 850 nm wavelength comprising: a polymerizable monomer composition and a compound, having a different refractive index from that of the polymerizable monomer composition, whose structure has a benzene ring substituted by a substituent having a Hammett value of not greater than 0.04 or by plural substituents having an average value of Hammett values thereof of not greater than 0.04. It is also disclosed a polymerizable composition for producing an optical member comprising a polymerizable monomer composition comprising at least one selected from the group consisting of $C_{7-20}$ alicyclic (meth)acrylates and a compound, having a different refractive index from that of the polymerizable monomer composition and having a solubility parameter of not greater than 10.9, whose structure has a benzene ring substituted by the substituent or the substituents defined above.

20 Claims, No Drawings ated with heavier atoms such as deuterium or fluorine atoms (Ref. pages from 41 to 66 of "Plastic Optical Fiber" published by KYORITSU SHUPPAN CO., LTD. in 1997, and edited by POF Consortium). Regarding known compounds which are added to the matrix materials in order to adjust a distribution of refractive index and ensure a sufficient difference in refractive index between a core and a clad

OPTICAL MEMBERS AND COMPOSITIONS FOR PRODUCING THEM

TECHNICAL FIELD

The present invention belongs to a technical field of plastic optical members, in particular belongs to a technical field of plastic optical members preferably applicable to plastic optical fibers, light guides or optical lenses, and polymerizable compositions for producing the plastic optical members.

RELATED ART

In recent years, plastic optical members are widely used for various applications including optical fibers, light guides and optical lenses, by virtue of its advantages such that allowing more simple producing and processing at a lower cost as compared with quartz-base optical members having the same structure. The plastic optical fiber is slightly inferior to quartz-base fiber since the entire region of the element fiber thereof is made of plastic material and has, as a consequence, a little larger transmission loss, but superior to the quartz-base optical fiber in that having an excellent flexibility, lightweight property, workability, better applicability in producing a large core diameter fiber and a lower cost. The plastic optical fiber is thus studied as a transmission medium for optical communication which is effected over a distance relatively as short as allowing such large transmission loss to be ignored (ref. pages from 1 to 8 of "Plastic Optical Fiber" published by KYORITSU SHUPPAN CO., LTD. in 1997, and edited by POF Consortium).

The plastic optical fiber generally has a center core (referred to as "core region" in the specification) made of an organic compound and comprises a polymer matrix, and an outer shell (referred to as "clad region" in the specification) made of an organic compound having a refractive index differing from (generally lower than) that of the core region. In particular, the plastic optical fiber having a graded refractive index along the direction from the center to the outside thereof, namely a GI type plastic optical fiber, recently attracts a good deal of attention as an optical fiber which can ensure a high transmission capacity. As one method for preparing such plastic optical fibers, it has been proposed a process comprising forming a fiber base member (referred to as "preform" in the specification) according to an interfacial gel polymerization and then drawing the preform (Ref. pages from 66 to 72 of "Plastic Optical Fiber" published by KYORITSU SHUPPAN CO., LTD. in 1997, and edited by POF Consortium; WO93/08388 and the like).

Optical transmitters are required to have little transmission loss and to have a high transmitting capacity. Especially, when plastic optical fibers are used with a light source emitting near-IR light such as 850 nm, an absorption attributed to overtone of stretching vibration of interatomic bonds is a factor responsible for increasing transmission loss. It has been known that an absorption attributed to overtone of C—H bond stretching vibration, which constitutes a matrix material of an plastic optical fiber, contributes to worsening transmission loss, and it has been often carried out replacing H atoms with heavier atoms such as deuterium or fluorine atoms (Ref. pages from 41 to 66 of "Plastic Optical Fiber" published by KYORITSU SHUPPAN CO., LTD. in 1997, and edited by POF Consortium). Regarding known compounds which are added to the matrix materials in order to adjust a distribution of refractive index and ensure a sufficient difference in refractive index between a core and a clad regions, referred to as "enhancer of refractive index" or "dopant", which may be non-polymerizable or polymerizable compound, almost all are compounds having at least one benzene ring, and it has been known that an absorption attributed to a fourth overtone of C—H stretching vibration in the benzene ring contributes to increasing transmission loss. Thus, it has been carried out deuteration of the enhancers of refractive index as well as the matrix materials (Ref. pages from 20 to 22 of WO93/08488). The deuteration thereof can achieve a remarkable reduction of transmission loss, however, there are other problems such that deuterated materials are generally so expensive and available compounds are limited to a few species.

It has been also known that compatibility between a matrix material and a dopant has significant effect on transmission loss. It has been also known that hydrophobic property of the matrix material containing the dopant has effect on transmission loss since there is an absorption attributed to overtone of OH stretching vibration within a wavelength range near 850 nm.

SUMMARY OF THE INVENTION

One object of the present invention is to provide a polymerizable composition capable of producing optical members for 850 nm wavelength in low cost.

Other object of the present invention is to provide with low cost an optical member having low transmission loss at 850 nm.

Other object of the present invention is to provide a polymerizable composition capable of producing optical members having a low transmission loss at 850 nm wavelength and a good moisture-heat-resistant property.

Other object of the present invention is to provide with low cost an optical member having a low transmission loss at 850 nm and a good moisture-heat-resistant property.

The present inventors conducted various studies, and as a result, they found that there is a correlation between an absorption peak attributed to a fourth overtone of C—H stretching vibration in a benzene ring and a Hammett value of a substituted group to the benzene ring, and that the absorption peak is shifted to longer wavelengths when the benzene ring was substituted by an electron-donating substituent. After further various studies, such as studies of hydrophobic combinations of dopants and matrix materials in the viewpoint of solubility parameters, on the basis of these findings, the present invention was achieved.

In one aspect, the present invention provides a polymerizable composition for producing an optical member for 850 nm wavelength comprising:

a polymerizable monomer composition, a polymerization initiator, and a compound, having a different refractive index from that of the polymerizable monomer composition, whose structure has a benzene ring substituted by a substituent having a Hammett value of not greater than 0.04 or by plural substituents having an average value of Hammett values thereof of not greater than 0.04.

As embodiments of the present invention, there are provided the polymerizable composition wherein the polymerizable monomer composition comprises at least one selected from the group consisting of esters of a propenoic acid and esters of derivatives thereof in a major proportion; the polymerizable composition wherein the polymerizable monomer composition comprises at least one selected from the group consisting of esters of a (meth)acrylic acid and esters of derivatives thereof in a major proportion; the polymerizable monomer composition wherein the polymerizable monomer composition comprises at least one selected from the group consisting of compounds including a C—F bond; and the polymerizable composition wherein the polymerizable monomer composition comprises at least one selected from the group consisting of compounds including a C-D (deuterium) bond.

In another aspect, the present invention provides an optical member produced by polymerization of the composition, so as to form a region having a graded refractive index.

In another aspect, the present invention provides an optical member for 850 nm wavelength comprises:

a polymer composition comprising at least one polymer selected from the group consisting of (meth)acrylates base polymers and a compound having a different refractive index from that of a polymerizable monomer composition of the polymer composition wherein the compound has an absorption peak attributed to a fourth overtone of C—H bond stretching vibration in a benzene ring at not shorter than 875 nm.

As embodiment of the present invention, there are provided the optical member wherein the compound is selected from the group consisting of:

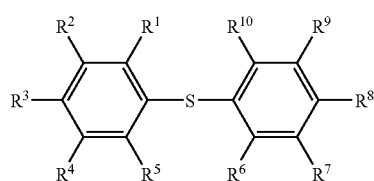

Formula (1)

wherein $R^1$ to $R^{10}$ respectively represent a hydrogen, an alkyl, an alkenyl, an alkyloxy, an alkenyloxy, or dialkylamino provided that at least four of them represent an alkyl, alkenyl, alkyloxy, alkenyloxy or dialkylamino; the optical member which comprises a region having a graded refractive index; and the optical member which comprises a region having a graded refractive index along the direction from the center to the outside.

In another aspect, the present invention provides a polymerizable composition for producing an optical member comprising:

a polymerizable monomer composition comprising at least one selected from the group consisting of:

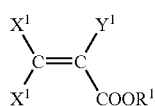

Formula (2)

wherein $X^1$ is hydrogen (H) or deuterium (D) wherein two $X^1$ may be same or different; $Y^1$ represents H, D, $CH_3$ or $CD_3$; and $R^1$ represents a $C_{7-20}$ alicyclic hydrocarbon group;

a polymerization initiator, and a compound, having a different refractive index from that of the polymerizable monomer composition and having a solubility parameter of not greater than 10.9, whose structure has a benzene ring substituted by a substituent having a Hammett value of not greater than 0.04 or by substituents having an average value of Hammett values thereof of not greater than 0.04.

AS embodiments of the present invention, there are provided the polymerizable composition wherein the polymerizable monomer composition comprises an alicyclic hydrocarbon methyl methacrylate and methyl methacrylate in a major proportion; and the polymerizable composition wherein the polymerizable monomer composition comprises at least one compound including a C-D bond.

In another aspect of the present invention, an optical member produced by polymerization of the composition, so as to form a region having a graded refractive index.

As embodiments of the present invention, there are provided the optical member comprising a core region having a graded refractive index, which is produced by polymerization of the composition and a clad region cladding the core region; the optical member wherein the core region having a graded refractive index along the direction from the center to the outside; and the optical member the clad region is essentially formed of a polymerizable monomer composition comprising a same ingredient or same ingredients in a major portion as those of the core region; and the optical member which is an optical fiber, a light guide or an optical lens.

In another aspect, the present invention provides a process for producing an optical member comprising a step of polymerizing the above polymerizable composition.

As embodiments of the present invention, there is provided the process wherein the step of polymerizing, the polymerization temperature is 50 degrees Celsius or above.

DETAILED DESCRIPTION OF THE INVENTION

The embodiments of the present invention are described in detail below.

It is to be noted that examples of the optical members produced by polymerization of the compositions according to the present invention include light guide devices such as optical fibers or light guides; lenses used for still cameras, camcorders, telescopes, glasses, plastic contact lenses or solar collectors; mirrors such as concave mirrors or polygon mirrors, and prisms such as pentaprism. Among these, the optical members are desirable applied to light guide devices, lenses or mirrors, and more desirable applied to optical fibers, light guides or lenses.

1. Polymerizable Composition

At first, embodiments of the polymerizable composition according to the present invention are described in detail below.

1-1 First Embodiment of the Polymerizable Composition

The first embodiment of the polymerizable composition according to the present invention essentially comprises a polymerizable monomer composition, a polymerization initiator capable of initiating polymerization thereof and a compound having a different refractive index from that of the monomer composition, occasionally referred to as "dopant" or "enhancer of refractive index" hereinafter. According to the first embodiment, the decrease of transmission loss due to a dopant can be achieved by using a compound, having at least one benzene ring substituted by a substituent having a Hammett value within a particular range or by groups having an average value of Hammett values thereof within the particular range, as a dopant. The composition of the first embodiment may be used for producing optical members, in particular optical members having a distribution in refractive index values.

Various materials used for the first embodiments are described below.

1-1-1 Polymerizable Monomer Composition

According to the first embodiment, the polymerizable monomer composition desirably comprises at least one selected from the group consisting of esters of propenoic acid and derivatives thereof in major proportion. Embodiments of esters of propenoic acids and derivatives thereof include acrylates and methacrylates, both of them are referred to as "(meth)acrylates" hereinafter. The term of "comprise a monomer in major proportion" is used for not only the embodiment consisting of the monomer, but also embodiments further comprising at least one polymerizable monomer other than the monomer so far as not lowering optical properties. The polymerizable monomer composition may contain at least one selected from the group consisting of (meth)acrylates and at least one selected from the group polymerizable monomers other than (meth)acrylates such as styrene or maleimide, so as to form any copolymers. When deuterated (meth)acrylates, in which at least a part of hydrogens are replaced with deuteriums, are used, optical members having low transmission loss can be produced, and thus deuterated (meth)acrylates are desirable. Using fluorinated (meth)acrylates may easily result in much difference of refractive index between the obtained optical fibers and copolymers of non-fluorinated monomers, and in consequence, may easily create graded refractive index structures. Thus, fluorinated (meth)acrylates are desirable.

Here lists examples of usable (meth)acrylates in the first embodiment, however, the examples are not limited to these.
(a) non-fluorinated (meth)acrylates such as methyl methacrylate, ethyl methacrylate, isopropyl methacrylate, t-butyl methacrylate, benzyl methacrylate, phenyl methacrylate, cyclohexyl methacrylate, diphenylmethyl methacrylate, tricyclo [5.2.1.0$^{2,6}$]decanyl methacrylate, adamantyl methacrylate, isobornyl methacrylate, methyl acrylate, ethyl acrylate, t-butyl acrylate or phenyl acrylate;
(b) fluorinated (meth)acrylates such as 2,2,2-trifluoroethyl methacrylate, 2,2,3,3-tetrafluoropropyl methacrylate, 2,2,3,3,3,-pentafluoropropyl methacrylate, 1-trifluoromethyl-2,2,2-trifluoroethyl methacrylate, 2,2,3,3,4,4,5,5-octafluoropentyl methacrylate or 2,2,3,3,4,4-hexafluorobutyl methacrylate are exemplified.

Polymerizable monomers other than (meth)acrylates may be used. Here lists examples of usable polymerizable monomers other than (meth)acrylates in the first embodiment, however, the examples are not limited to these.
(c) styrene base compounds such as styrene, alpha-styrene, chlorostyrene or bromostyrene;
(d) vinyl esters such as vinyl acetate, vinyl benzoate, vinyl phenylacetate or vinyl chloroacetate;
(e) maleimides such as N-n-butylmaleimide, N-t-butylmaleimide, N-isopropylmaleimide or N-cyclohexyl maleimide are exemplified.

According to the first embodiment, one compound, or two or more compounds, selected from the group consisting of (meth)acrylates may be used as a major component of the polymerizable monomer composition. The content of the compound, or the content of the two or more compounds, selected from the group consisting of (meth)acrylates is desirably not smaller than 50 wt %, more desirably not smaller than 60 wt % mass, and much more desirably 70 wt %, of the total polymerizable composition, and most desirably, all monomers contained in the polymerizable monomer composition are selected from the group consisting of (meth)acrylates.

According to the first embodiment, as using a particular class of a compound described below are used for a dopant, the composition containing the dopant has a greater refractive index than that of a composition not containing the dopant, or the copolymer containing the dopant as a copolymerization monomer has a greater refractive index than that of a polymer not containing the dopant as a copolymerization monomer. Fluorinated polymerizable monomers, in which at least a part of hydrogen atoms in C—H bonds are replaced with fluorine atoms, having at least a C—F bond, are desirably used. In particular, any compounds selected from the group consisting of the above-mentioned fluorinated (meth)acrylates, or any mixtures of at least one selected from the group consisting of the above-mentioned fluorinated (meth)acrylates and fluorinated acrylates and at least one selected from the group consisting of non-fluorinated (meth)acrylates are desirably used.

In order to further lower transmission loss, deuterated compounds of the monomers exemplified above may be used desirably.

1-1-2 Polymerization Initiator

The composition comprises a polymerization initiator which can initiate polymerization of the polymerizable monomer composition. The polymerization initiator may be selected from known polymerizable initiators depending on various factors such as polymerizable monomers contained in the composition or polymerization process. The examples of the polymerization initiator include peroxides such as benzoyl peroxide (BPO), t-butylperoxy-2-ethylhexanate (PBO), di-t-butylperoxide (PBD), t-butylperoxyisopropylcarbonate (PBI) or n-butyl-4,4-bis(t-butylperoxy)valerate (PHV); and azo compounds such as 2,2'-azobisisobuthylonitrile, 2,2'-azobis(2-methylbuthylonitrile), 1,1'-azobis(cyclohexane-1-carbonitrile), 2,2'-azobis(2-methylpropane), 2,2'-azobis(2-methylbutane), 2,2'-azobis(2-methylpentane), 2,2'-azobis(2,3-dimethylbutane), 2,2'-azobis(2-methylhexane), 2,2'-azobis(2,4-dimethylpentane), 2,2'-azobis(2,3,3-trimethylbutane), 2,2'-azobis(2,4,4-trimethylpentane), 3,3'-azobis(3-methylpentane), 3,3'-azobis(3-methylhexane), 3,3'-azobis(3,4-dimethylpentane), 3,3'-azobis(3-ethylpentane), dimethyl-2,2'-azobis(2-methylpropionate), diethyl-2,2'-azobis(methylpropionate) or di-t-butyl-2,2'-azobis(2-methylpropionate).

Two or more polymerization initiators may be used in combination.

1-1-3 Chain Transfer Agent

The composition according to the first embodiment desirably contains a chain transfer agent. The chain transfer agent may mainly be used for adjusting molecular weight of the obtained polymer. The chain transfer agent can be properly selected in consideration of the monomer to be employed. The chain transfer constants of the chain transfer agents for various monomers can be referred to publications such as "Polymer Handbook 3$^{rd}$ edition" edited by J. BRANDRUP and E. H. IMMERGUT, published by JOHN WILEY&SON. The chain transfer constants can be also obtained by experimental tests according to methods disclosed in "Kohbunshi gousei no jikkenhou (Experimental methods for polymer synthesis)" written by Takayuki Ohtsu and Masaetsu Kinoshita, published by Kagaku-Dojin Publishing Company, INC (1972).

When methyl methacrylate is used as a polymerizable monomer, at least one selected from the group consisting of alkylmercaptans (n-butylmercaptan, n-pentylmercaptan, n-octylmercaptan, n-laurylmercaptan, t-dodecylmercaptan, etc.) and thiophenols (thiophenol, m-bromothiophenol, p-bromothiophenol, m-toluenethiol, p-toluenethiol, etc.) is desirably used as a chain transfer agent. Among these, alkyl mercaptans such as n-octylmercaptan, n-laurylmercaptan or t-dodecylmercaptan are preferred. It is also possible to use the chain transfer agents in which at least a part of hydrogen atoms of C—H bonds are replaced with deuterium atoms. Two or more chain transfer agents may be used in combination.

1-1-4 Dopant: Enhancer of Refractive Index

The polymerizable composition according to the first embodiment contains a compound having a different refractive index from that of the polymerizable monomer composition. The dopant may be polymerizable or non-polymerizable. When a polymerizable dopant is used, it may be more difficult to adjust various properties since the copolymerization of the polymerizable monomer composition and the dopant may be carried out, however, the advantage in heat resistant property may be obtained. The dopant is also referred to as enhancer of refractive index, and a compound having a property that increases the refractive index of a composition containing it as compared with a composition not containing it, or increases the refractive index of a copolymer containing it as a copolymerization component as compared with a polymer not containing it. The difference in refractive index between the composition containing the dopant and the composition not containing the dopant is desirably not smaller than 0.001.

According to the first embodiment, at least one compound selected from the group consisting of benzene derivatives having a benzene ring substituted by at least one substituent is used as a dopant. The present inventors found that there is a negative correlation between the Hammett value of the substituent and the wavelength of the absorption peak attributed to the fourth overtone of C—H stretching vibration in the benzene ring. In other words, they found that the absorption peak attributed to the fourth overtone of C—H bond stretching vibration in a benzene ring is influenced by the substituents of other carbon atoms in the benzene ring, and that the absorption peak attributed to the fourth overtone of the stretching vibration is shifted to longer wavelengths as the Hammett values thereof are smaller. In order to lower transmission loss at 850 nm, it is preferred that the absorption peak attributed to the fourth overtone of C—H stretching vibration is shifted to longer wavelengths so that the absorption peak or the foot of the absorption is far from 850 nm.

For preventing the dopant from influencing absorption at 850 nm, the dopant desirably has the absorption peak at not shorter than 875 nm, more desirably at not shorter than 877 nm and much more desirably at not shorter than 880 nm. When the dopant having an absorption peak at not shorter than 880 nm is used, transmission loss may hardly occur due to the absorption of a transmitting light of 850 nm.

In order to shift the absorption peak attributed to the fourth overtone of C—H stretching vibration to longer wavelengths, the Hammett value of a substituent or plural substituents is desirably not greater than 0.04, more desirably not greater than −0.05 and much more desirably not greater than −0.1. The minimum of the Hammett value is desirably −0.6. In addition, by introduction of such a substituent or such substituents, the number of C—H bonds is decreased, and transmission loss due to an absorption attributed fourth overtone of C—H stretching vibration itself may be further lowered as a secondary effect.

In the specification, when there is a substituent, the Hammett value means the Hammett constant of the substituent as described in Chemical Reviews, Vol. 91, No. 2, pp. 168-175 (1991). The same Hammett constant is generally used for both of substituting at ortho position and at para position, on the other hand, the different Hammett constant is used for substituting at meta position. For example, given a benzene compound substituted by a substituent, there are two hydrogen atoms respectively at ortho position and is one hydrogen atom at para position with respect to the position of the substituent $R^1$. When the Hammett constant of $R^1$ at both of para and ortho positions is $\sigma_{1p}$ and the Hammett constant of $R^1$ at meta position is $\sigma_{1m}$, the Hammett value $\sigma$ can be calculated with the following formula:

$$\sigma = (\sigma_{1p} \times 3 + \sigma_{1m} \times 2)/5$$

On the other hand, when there are plural substituents, the Hammett value means an average value of Hammett values thereof. The process for calculating the Hammett value when there are plural substituents will be described hereinafter with examples respectively having one benzene ring and two benzene rings. It is noted that the Hammett constant of $R^i$, when i is any positive number, substituting at meta position is referred to as $\sigma_{1m}$ and the Hammett constant of $R^i$ substituting at either para or ortho position is referred to as $\sigma_{1p}$, in other words, the Hammett constant for para position is used for ortho position.

Calculating method when there is one benzene ring:

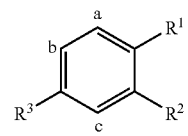

In the above structure, the sum of the Hammett values of substituents $R^1$, $R^2$ and $R^3$, for each positions a, b and c is:

$$\sigma_a = \sigma_{1p} + \sigma_{2m} + \sigma_{3m};$$

$$\sigma_b = \sigma_{1m} + \sigma_{2p} + \sigma_{3p};$$

$$\sigma_c = \sigma_{1m} + \sigma_{2p} + \sigma_{3p}.$$

The average value of $\sigma_a$, $\sigma_b$ and $\sigma_c$, i.e. the sum average thereof, which is calculated according to the following formula, is the Hammett value of the plural substituents which the above compound has.

$$\sigma = (\sigma_a + \sigma_b + \sigma_c)/3$$

Calculating method when there are two benzene rings substituents:

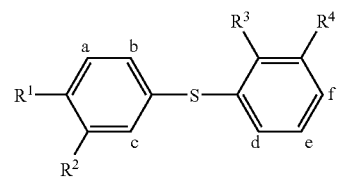

In the above structure, the sum of the Hammett values of substituents $R^1, R^2, R^3, R^4$ and —S—Ar group for each the positions a, b, c, d, e and f is:

$$\sigma_a = \sigma_{1p} + \sigma_{2m} + \sigma_{(Sph)m};$$

$$\sigma_b = \sigma_{1m} + \sigma_{2p} + \sigma_{(Sph)p};$$

$$\sigma_c = \sigma_{1m} + \sigma_{2p} + \sigma_{(Sph)p};$$

$$\sigma_d = \sigma_{3m} + \sigma_{4p} + \sigma_{(Sph)p};$$

$$\sigma_e = \sigma_{3p} + \sigma_{4m} + \sigma_{(Sph)m};$$

$$\sigma_f = \sigma_{1m} + \sigma_{2p} + \sigma_{(Sph)p}.$$

It is noted that the Hammett constant of —S-Ph, i.e. $\sigma_{(Sph)m}$ or $\sigma_{(Sph)p}$, where Ph represents a non-substituted benzene ring, is used for —S—Ar, where Ar represents substituted phenyl, with regarding all —S—Ar as —S-Ph.

The average value of $\sigma_a$ to $\sigma_f$, i.e. the sum average thereof, which is calculated according to the following formula, is the Hammett value of the plural substituents that the above compound has.

$$\sigma = (\sigma_a + \sigma_b + \sigma_c + \sigma_d + \sigma_e + \sigma_f)/6$$

Here lists examples of benzene derivatives substituted by one substituent or plural substituents having a Hammett value of not greater that 0.04.

(1)

σ = -0.51
Hammett Value (2)

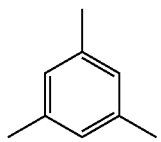

σ = -0.07

(3)

σ = -0.16

(4)

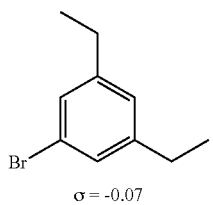

σ = -0.11

(5)

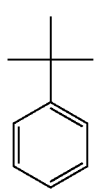

σ = -0.018

-continued (6)

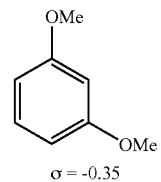

σ = -0.35

(7)

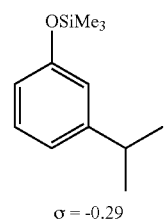

σ = -0.29

(8)

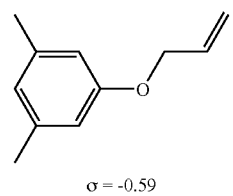

σ = -0.59

(9)

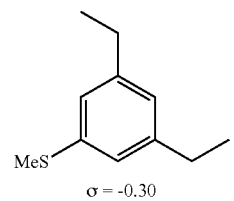

σ = -0.30

(10)

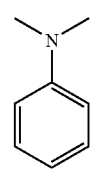

σ = -0.56

Among the compounds having a benzene ring substituted with one substituent or plural substituents having a Hammett value of not greater than 0.04, the compounds which has a refractive index equal to or greater than that, i.e. 1.56, of deuterated bromo benzene d-5. Examples of the compounds satisfying these conditions are shown below, but not limited to theses.

(11)

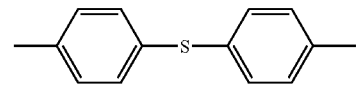

σ = 0.03*

(12)

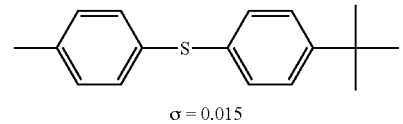

σ = 0.015

-continued
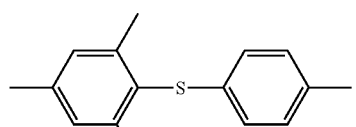
σ = −0.073
(13)
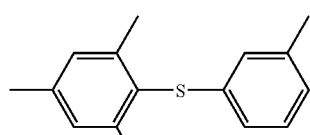
σ = −0.117
(14)
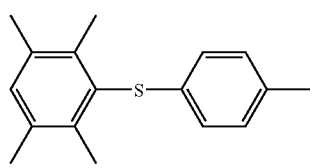
σ = −0.058
(15)
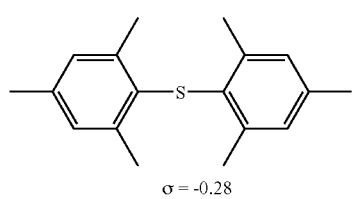
σ = −0.28
(16)
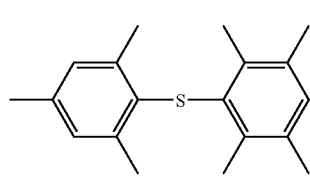
σ = −0.32
(17)
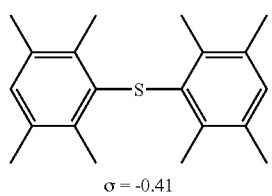
σ = −0.41
(18)
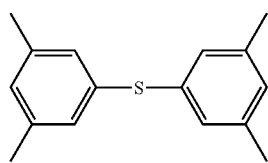
σ = −0.27
(19)
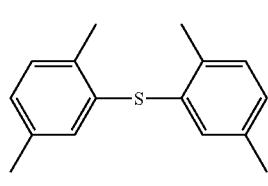
σ = −0.117
(20)
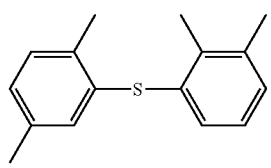
σ = −0.117
(21)
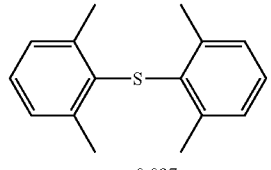
σ = −0.097
(22)
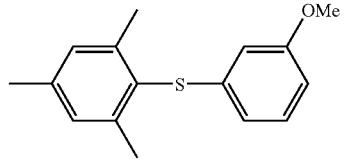
σ = −0.285
(23)
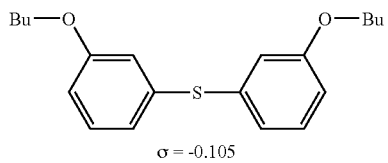
σ = −0.105
(24)
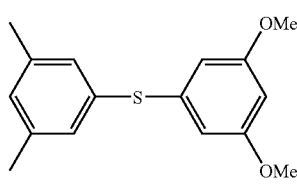
σ = −0.105
(25)
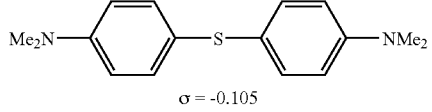
σ = −0.105
(26)
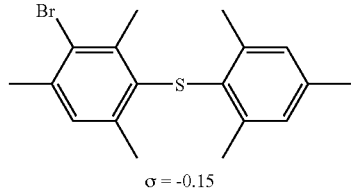
σ = −0.15
(27)
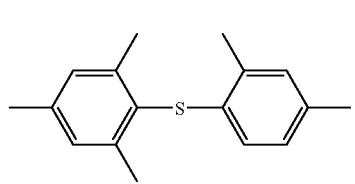
σ = −0.17
(28)

-continued

(29)
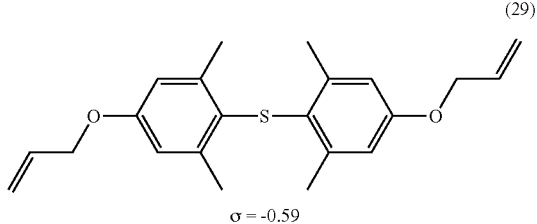
σ = -0.59

(30)
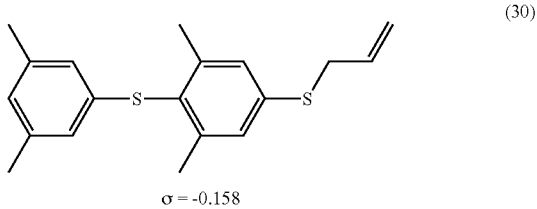
σ = -0.158

(31)
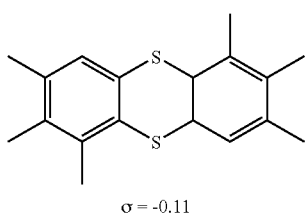
σ = -0.11

(32)
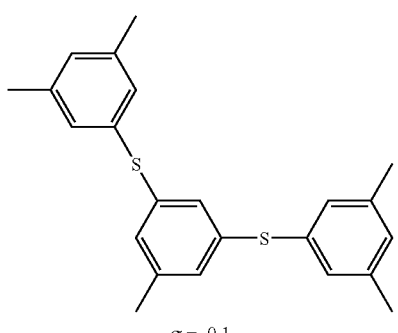
σ = -0.1

(33)
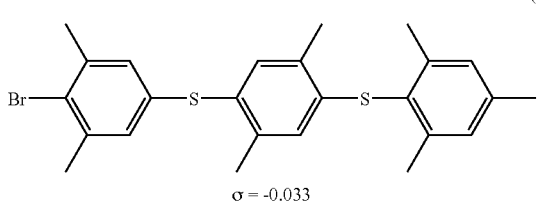
σ = -0.033

According to the first embodiment, the dopant is desirably selected from the group consisting of compounds which are denoted by the following formula (1) and satisfy the above mentioned conditions.

Formula (1)
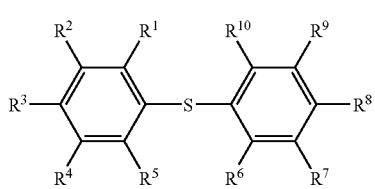

In the formula (1), $R^1$ to $R^{10}$ respectively represent a hydrogen atom, an alkyl, an alkenyl, an alkyloxy, an alkenyloxy, or dialkylamino provided that at least four of them represent an alkyl, an alkenyl, an alkyloxy, an alkenyloxy or a dialkylamino.

One dopant or two or more dopants may be used in the polymerizable composition of the present invention. It is necessary that all compounds used as a dopant are selected from the group consisting of the compounds having a benzene ring substituted by a substituent having a Hammett value not greater than 0.04, or by substituents having an average of the Hammett values thereof not greater than 0.04.

An optical member having a graded refractive index can be prepared by grading the concentration of the dopant while polymerization of the polymerizable composition of the first embodiment. One usable process for grading the dopant concentration is an interfacial gel polymerization process described later.

Preferable ranges of the amount of the components respectively may properly be determined in consideration of species to be employed, where the additional amount of the polymerization initiator is desirably within a range from 0.005 to 0.5 wt % and more desirably within a range from 0.010 to 0.50 wt %, with respect to of the polymerizable monomer composition; and the additional amount of the chain transfer agent is desirably within a range from 0.10 to 0.40 wt %, and more desirably within a range from 0.15 to 0.30 wt %, with respect to of the polymerizable monomer composition. The additional amount of the dopant is desirably in a range from 1 to 30 wt %, and more desirably in a range from 1 to 25 wt %, with respect to the polymerizable monomer composition.

It is noted that as the additional amount of the dopant is great, the thermoplasticity of a polymer being added the dopant is easily developed, as with that the glass transition point, Tg, is lowered, and the heat resistant property during use is lowered. Thus, the dopant which can achieve a desired distributed refractive index in smaller amount is preferred.

Another possible strategy relates to addition of other additives to the polymerizable composition to an extent not degrading the light transmission property. For example, an additive can be added in order to improve the weatherability or durability. It is also allowable to add an emission inductive material for amplifying light signal for the purpose of improving the light transmission property. Since even attenuated light signal can be amplified by addition of such compound to thereby elongate the length of transmission, the compound is typically applicable to produce a fiber amplifier at a part of light transmission link.

When heat and/or light is irradiated to the polymerizable composition, radicals and the like are generated from the initiator, thereby inducing the polymerization of the polymerizable monomer. Since the polymerizable composition according to the first embodiment contains the dopant, the refractive-index-distributed structure can readily be obtained by controlling the proceeding direction of the polymerization, typically by the interfacial gel polymerization process described later, so as to create a concentration gradient of the dopant, or so as to create a copolymerization ratio gradient of the dopant and the polymerizable monomer. According to the first embodiment, for preventing absorption attributed to the fourth overtone of C—H stretching vibration in a benzene ring from influencing 850 nm light of a light source, the dopant improved so that the absorption is significantly shifted to longer wavelengths is used, and therefore, transmission loss due to the dopant can be lowered. The polymer having a desired molecular weight can be obtained by adjusting a polymerization rate and/or degree with a polymerization initiator or a chain transfer agent which is occasionally added to the composition. When the polymerizable composition comprising a chain transfer agent is used, the molecular weight of the polymer can be adjusted by the chain transfer agent so as to be suitable in mechanical properties for drawing. Therefore, using such composition can also contribute to improvement in productivity when an optical fiber is prepared by drawing the preform produced by polymerization of the composition.

An optical member, which comprises a polymer composition and a dopant and has a distributed refractive index based on a distribution of the dopant concentration, can be produced by polymerization of the polymerizable composition of the present invention. Since the dopant has an absorption peak attributed to the fourth overtone of C—H stretching vibration in a benzene ring at not greater than 875 nm, transmission loss due to the dopant can be remarkably lowered. The dopant is desirably selected from the group consisting of the above Formula (1). The polymer contained in the polymer composition is desirably selected from the group consisting of homopolymers and copolymers of (meth)acrylates.

1-2 Second Embodiment of the Polymerizable Composition

The second embodiment of the polymerizable composition may be used for preparing optical member for 850 nm light source wavelength. The polymerizable composition essentially comprises a polymerizable monomer composition, a polymerization initiator capable of initiating polymerization thereof and a compound having a different refractive index from that of the monomer composition, occasionally referred to as "dopant" or "enhancer of refractive index" hereinafter. According to the second embodiment, by using a compound, having at least one benzene ring substituted by a substituent having a Hammett value within a particular range or by substituents having an average value of Hammett values thereof within the particular range, as a dopant, transmission loss due to the dopant can be lowered. In addition, under consideration of compatibility with a matrix material, by using a compound further having a solubility parameter within a particular range, transmission loss of the optical member produced by polymerization of the composition can be reduced down to a further lower level. The polymerizable composition of the second embodiment may be used for producing optical members, in particular optical members having a distribution in refractive index values. Various materials used for the second embodiments are described below.

1-2-1 Polymerizable Monomer Composition

According to the second embodiment, the polymerizable monomer composition desirably comprises at least one selected from the group consisting of esters of propenoic acid and derivatives thereof is preferably contained in major proportion. Examples of esters of propenoic acids and derivatives thereof include acrylates and methacrylates, both of them are referred to as "(meth)acrylates" hereinafter. The term of "comprise a monomer in major proportion" is used for not only the embodiment consisting of the monomer, but also embodiments further comprising at least one polymerizable monomer other than the monomer so far as not lowering optical properties. For example, the composition may comprise at least one selected from monomers other than (meth)acrylates, such as styrene or maleimide, to form a copolymer. According to the second embodiment, in particular, in the viewpoint of improvement of moisture-heat-resistant property, alicyclic (meth)acrylates denoted by Formula (2) are used desirably.

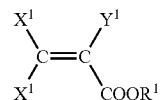

Formula (2)

In the formula $X^1$ is hydrogen (H) or deuterium (D) wherein two $X^1$ may be same or different; $Y^1$ represents H, D, $CH_3$ or $CD_3$; and $R^1$ represents a $C_{7-20}$ alicyclic hydrocarbon group.

The polymerizable monomer denoted by the formula (2) is a (meth)acrylate derivative having a $C_{7-20}$ alicyclic hydrocarbon group. The examples of the polymerizable monomer include bicyclo [2.2.1] heptyl-2 (meth)acrylate, 1-adamantyl (meth)acrylate, 2-adamantyl (meth)acrylate, 3-methyl-1-adamanthyl (meth)acrylate, 3,5-dimethyl-1-adamantyl (meth)acrylate, 3-ethyladamanthyl (meth)acrylate, 3-methyl-5-ethyl-1-adamanthyl (meth)acrylate, 3,5,8-triethyl-1-adamanthyl (meth)acrylate, 3,5-dimethyl-8-ethyl-1-adamanthyl (meth)acrylate, octahydro-4,7-menthanoindene-5-il (meth)acrylate, octahydro-4,7-menthanoidene-1-ylmethyl (meth)acrylate, tricyclodecyl (meth)acrylate, 3-hydroxy-2, 6,6-trimethyl-bicycl[3.1.1]heptyl (meth)acrylate, 3,7,7-trimethyl-4-hydroxy-bicyclo [4.1.0]heptyl (meth)acrylate, (nor) bornyl (meth)acrylate, isobornyl (meth)acrylate, phentyl (meth)acrylate and 2,2,5-trimethylcyclohexyl (meth)acrylate. Among them, bornyl (meth)acrylate, isobornyl (meth)acrylate and phentyl (meth)acrylate are desirable, and bornyl (meth)acrylate and isobornyl (meth)acrylate are more desirable.

According to the second embodiment, two or more compounds selected from the group consisting of (meth)acrylates are desirably used as a major component in the polymerizable monomer composition. The content of at least one compound denoted by the formula (2) is desirably from 5 to 95 wt %, more desirably from 10 to 95 wt % and much more desirably from 10 to 90 wt % with respect to the total weight of the polymerizable monomer composition. In the viewpoint of compensating for brittleness and mechanistic properties of the compound denoted by the formula (2), other preferred examples of (meth)acrylates which can be used as a polymerizable monomer include methyl methacrylate, ethyl methacrylate, isopropyl methacrylate, t-butyl methacrylate, benzyl methacrylate, phenyl methacrylate, cyclohexyl methacrylate, methyl acrylate, ethyl acrylate, n-butyl acrylate, t-butyl acrylate and phenyl acrylate. Among these, methyl methacrylate is most desirable.

When at least one compound selected from the group consisting of the formula (2) and methyl methacrylate as the other polymerizable monomer are used in combination, in order to ensure an adequate hydrohobicity, the content of the at least one compound selected from the group consisting of the formula (2) is desirably not lower than 10 wt % and more desirably not lower than 15 wt % with respect to the total weight of the polymerizable monomers. When a polymerizable monomer other than methyl methacrylate is used, the preferred range is limited to the range.

At least one monomer other than (meth)acrylates may be used in the second embodiment. Other examples of the polymerizable monomer which can be used in the second embodiment will be shown below, but not limited to these.

(c) styrene base compounds such as styrene, alpha-styrene, chloro styrene or bromo styrene;

(d) vinyl esters such as vinyl acetate, vinyl benzoate, vinyl phenylacetate or vinyl chloroacetate; and (e) maleimides such as N-n-butylmaleimide, N-t-butylmaleimide, N-isopropylmaleimide or N-cyclohexyl maleimide are exemplified.

According to the present invention, when at least two compounds selected from the group consisting of (meth) acrylates are used as a major component of the polymerizable monomer composition, the total content of the (meth) acrylates is desirably not smaller than 50 wt %, more desirably not smaller than 60 wt %, much more desirably not smaller than 70 wt % and most desirably 100 wt % with respect to the total weight of the polymerizable monomer composition.

According to the second embodiment, as using a particular class of a compound described below are used for a dopant, the composition containing the dopant has a greater refractive index than that of a composition not containing the dopant, or the copolymer containing the dopant as a copolymerization monomer has a greater refractive index than that of a polymer not containing the dopant as a copolymerization monomer. The C—H bonds included in the polymerizable monomer may contribute to increasing transmission loss of the optical member, especially for 850 nm light source wavelength, so that it is more desirable to use deuterated polymerizable monomer including at least one C-D bond.

1-2-2 Polymerization Initiator

The composition comprises a polymerization initiator which can initiate polymerization of the polymerizable monomer composition. The polymerization initiator may be selected from known polymerizable initiators depending on various factors such as polymerizable monomers contained in the composition or the polymerization process. The examples of the polymerization initiator include peroxides such as benzoyl peroxide (BPO), t-butylperoxy-2-ethylhexanate (PBO), di-t-butylperoxide (PBD), t-butylperoxyisopropylcarbonate (PBI) or n-butyl-4,4-bis(t-butylperoxy)valerate (PHV); and azo compounds such as 2,2'-azobisisobuthylonitrile, 2,2'-azobis(2-methylbuthylonitrile), 1,1'-azobis(cyclohexane-1-carbonitrile), 2,2'-azobis(2-methylpropane), 2,2'-azobis(2-methylbutane), 2,2'-azobis(2-methylpentane), 2,2'-azobis(2,3-dimethylbutane), 2,2'-azobis(2-methylhexane), 2,2'-azobis(2,4-dimethylpentane), 2,2'-azobis(2,3,3-trimethylbutane), 2,2'-azobis(2,4,4-trimethylpentane), 3,3'-azobis(3-methylpentane), 3,3'-azobis(3-methylhexane), 3,3'-azobis(3,4-dimethylpentane), 3,3'-azobis(3-ethylpentane), dimethyl-2,2'-azobis(2-methylpropionate), diethyl-2,2'-azobis(2-methyl propionate) or di-t-butyl-2,2'-azobis(2-methylpropionate).

Two or more polymerization initiators may be used in combination.

1-2-3 Chain Transfer Agent

The composition according to the second embodiment may comprise a chain transfer agent. The chain transfer agent may mainly be used for adjusting molecular weight of the obtained polymer. The chain transfer agent can be properly selected in consideration of the monomer to be employed. The chain transfer constants of the chain transfer agents for various monomers can be referred to publications such as "Polymer Handbook $3^{rd}$ edition" edited by J. BRANDRUP and E. H. IMMERGUT, published by JOHN WILEY&SON. The chain transfer constants can be also obtained by experimental tests according to methods disclosed in "Kohbunshi gousei no jikkenhou (Experimental methods for polymer synthesis)" written by Takayuki Ohtsu and Masaetsu Kinoshita, published by Kagaku-Dojin Publishing Company, INC (1972).

When methyl methacrylate is used as a polymerizable monomer, at least one selected from the group consisting of alkylmercaptans (n-butylmercaptan, n-pentylmercaptan, n-octylmercaptan, n-laurylmercaptan, t-dodecylmercaptan, etc.) and thiophenols (thiophenol, m-bromothiophenol, p-bromothiophenol, m-toluenethiol, p-toluenethiol, etc.) is desirably used as a chain transfer agent. Among these, alkyl mercaptans such as n-octylmercaptan, n-laurylmercaptan or t-dodecylmercaptan are preferred. It is possible to use the chain transfer agents in which at least a part of hydrogen atoms of C—H bonds are replaced with deuterium atoms. Two or more chain transfer agents may be used in combination.

1-2-4 Dopant: Enhancer of Refractive Index

The polymerizable composition according to the second embodiment comprises a compound having a different refractive index from that of the polymerizable monomer composition. The dopant may be polymerizable or non-polymerizable. When a polymerizable dopant is used, it may be more difficult to adjust various properties since the copolymerization of the polymerizable monomer composition and the dopant may be carried out, however, the advantage in heat resistant property may be obtained. The dopant is also referred to as enhancer of refractive index, and a compound having a property that increases the refractive index of a composition containing it as compared with a composition not containing it, or increases the refractive index of a copolymer containing it as a copolymerization component as compared with a polymer not containing it. The difference in refractive index between the composition containing the dopant and the composition not containing the dopant is desirably not smaller than 0.001.

According to the second embodiment, at least one compound selected from the group consisting of benzene derivatives having a benzene ring substituted by at least one substituent is used as a dopant. The present inventors found that there is a negative correlation between the Hammett value of the substituent and the wavelength of the absorption peak attributed to the fourth overtone of C—H stretching vibration in the benzene ring. In other words, they found that the absorption peak attributed to the fourth overtone of C—H bond stretching vibration in a benzene ring is influenced by the substituents of other carbon atoms in the benzene ring, and that the absorption peak attributed to the fourth overtone of the stretching vibration is shifted to longer wavelengths as the Hammett values thereof are smaller. In order to lower transmission loss at 850 nm, it is preferred that the absorption peak attributed to the fourth overtone of C—H stretching vibration is shifted to longer wavelengths so that the absorption peak or the foot of the absorption is far from 850 nm.

For preventing the dopant from influencing absorption at 850 nm, the dopant desirably has the absorption peak at not shorter than 875 nm, more desirably at not shorter than 877 nm and much more desirably at not shorter than 880 nm. When the dopant having an absorption peak at not shorter than 880 nm is used, transmission loss may hardly occur due to the absorption of a transmitting light of 850 nm.

In order to shift the absorption peak attributed to the fourth overtone of C—H stretching vibration to longer wavelengths, the Hammett value of a substituent or plural substituents is desirably not greater than 0.04, more desirably not greater than −0.05 and much more desirably not greater than −0.1. The minimum of the Hammett value is desirably −0.6. In addition, by introduction of such a substituent or such substituents, the number of C—H bonds is decreased, and transmission loss due to an absorption attributed fourth overtone of C—H stretching vibration itself may be further lowered as a secondary effect.

In the specification, when there is a substituent, the Hammett value means the Hammett constant of the substituent as described in Chemical Reviews, Vol. 91, No. 2, pp. 168-175 (1991). The same Hammett constant is generally used for both of substituting at ortho position and at para position, on the other hand, the different Hammett constant is used for substituting at meta position. For example, given a benzene compound substituted by a substituent, there are two hydrogen atoms respectively at ortho position and is one hydrogen atom at para position with respect to the position of the substituent $R^1$. When the Hammett constant of $R^1$ at both of para and ortho positions is $\sigma_{1p}$ and the Hammett constant of $R^1$ at meta position is $\sigma_{1m}$, the Hammett value $\sigma$ can be calculated with the following formula:

$$\sigma = (\sigma_{1p} \times 3 + \sigma_{1m} \times 2)/5$$

On the other hand, when there are plural substituents, the Hammett value means an average value of Hammett values thereof. The process for calculating the Hammett value when there are plural substituents will be described hereinafter with examples respectively having one benzene ring and two benzene rings. It is noted that the Hammett constant of $R^i$, when i is any positive number, substituting at meta position is referred to as $\sigma_{1p}$ and the Hammett constant of $R^i$ substituting at either para or ortho position is referred to as $\sigma_{1p}$, in other words, the Hammett constant for para position is used for ortho position.

Calculating method when there is one benzene ring:

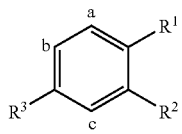

In the above structure, the sum of the Hammett values of substituents $R^1$, $R^2$ and $R^3$ for each of the positions a, b and c is:

$$\sigma_a = \sigma_{1p} + \sigma_{2m} + \sigma_{3m};$$

$$\sigma_b = \sigma_{1m} + \sigma_{2p} + \sigma_{3p};$$

$$\sigma_c = \sigma_{1m} + \sigma_{2p} + \sigma_{3p}.$$

The average value of $\sigma_a$, $\sigma_b$ and $\sigma_c$, i.e. the sum average thereof, which is calculated according to the following formula, is the Hammett value of the plural substituents which the above compound has.

$$\sigma = (\sigma_a + \sigma_b + \sigma_c)/3$$

Calculating method when there are plural substituents:

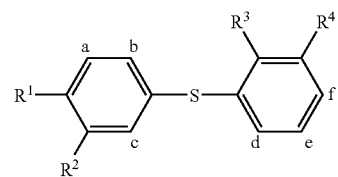

In the above structure, the sum of the Hammett values of substituents $R^1$, $R^2$, $R^3$, $R^4$ and —S—Ar group for each of the positions a, b, c, d, e and f is:

$$\sigma_a = \sigma_{1p} + \sigma_{2m} + \sigma_{(Sph)m};$$

$$\sigma_b = \sigma_{1m} + \sigma_{2p} + \sigma_{(Sph)p};$$

$$\sigma_c = \sigma_{1m} + \sigma_{2p} + \sigma_{(Sph)p};$$

$$\sigma_d = \sigma_{3m} + \sigma_{4p} + \sigma_{(Sph)p};$$

$$\sigma_e = \sigma_{3p} + \sigma_{4m} + \sigma_{(Sph)m};$$

$$\sigma_f = \sigma_{1m} + \sigma_{2p} + \sigma_{(Sph)p}.$$

It is noted that the Hammett constant of —S-Ph, i.e. $\sigma_{(Sph)m}$ or $\sigma_{(Sph)p}$, where Ph represents a non-substituted benzene ring, is used for —S—Ar, where Ar represents substituted phenyl, with regarding all —S—Ar as —S-Ph.

The average value of $\sigma_a$ to $\sigma_f$, i.e. the sum average thereof, which is calculated according to the following formula, is the Hammett value of the plural substituents that the above compound has.

$$\sigma = (\sigma_a + \sigma_b + \sigma_c + \sigma_d + \sigma_e + \sigma_f)/6$$

Furthermore, the compatibility of the matrix material and the dopant used in combination also significantly influences to transmission loss. As described above, the matrix material having an adequate hydrohobicity can have both of a good moisture-heat-resistant property and good mechanical property. The present inventors conducted various studies to obtain dopants having a good compatibility, and as a result, they found that benzene derivatives which has a solubility parameter (SP) of not greater than 10.9, desirably not greater than of 10.8, more desirably not greater than 10.6, can exhibit a good compatibility, and by usage such compounds, optical members having good transparency and low transmission loss are obtainable. The examples of the dopant having a benzene ring substituted by one substituent or plural substituents, having a Hammett value of not greater that 0.04, and a SP value of not greater than 10.9, are shown below, but not to limited to these. It is noted that SP values were calculated according to Fedors' method described in "Polymer Engineering and Science", vol. 14, P. 147-154.

2-(1)

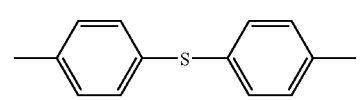

$\sigma = 0.03*$
SP value 10.7

-continued
2-(2)
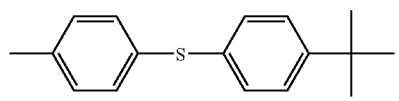
σ = 0.015
SP value 10.7
2-(3)
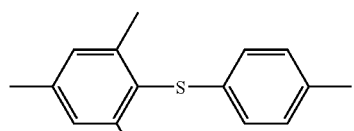
σ = -0.073
SP value 10.4
2-(4)
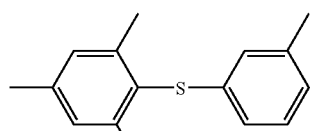
σ = -0.117
SP value 10.4
2-(5)
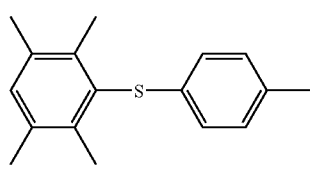
σ = -0.058
SP value 10.3
2-(6)
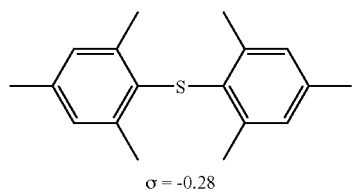
σ = -0.28
SP value 10.3
2-(7)
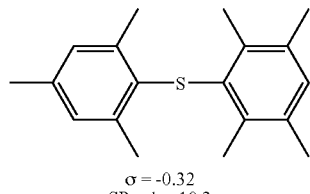
σ = -0.32
SP value 10.2
2-(8)
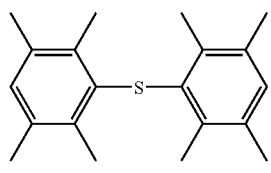
σ = -0.41
SP value 10.1
-continued
2-(9)
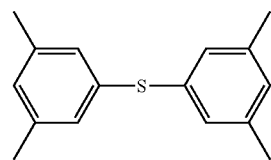
σ = -0.27
SP value 10.4
2-(10)
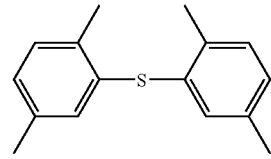
σ = -0.117
SP value 10.4
2-(11)
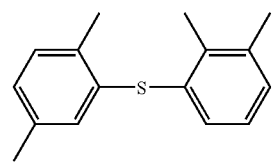
σ = -0.117
SP value 10.4
2-(12)
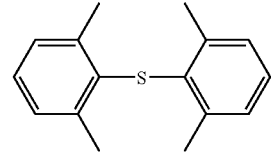
σ = -0.097
SP value 10.4
2-(13)
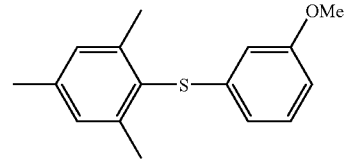
σ = -0.285
SP value 10.5
2-(14)
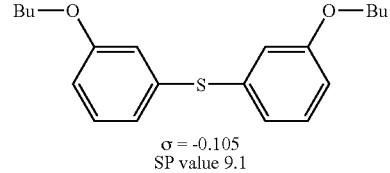
σ = -0.105
SP value 9.1
2-(15)
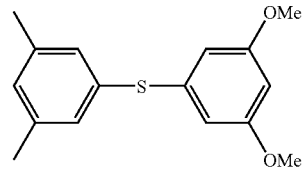
σ = -0.105
SP value 10.6

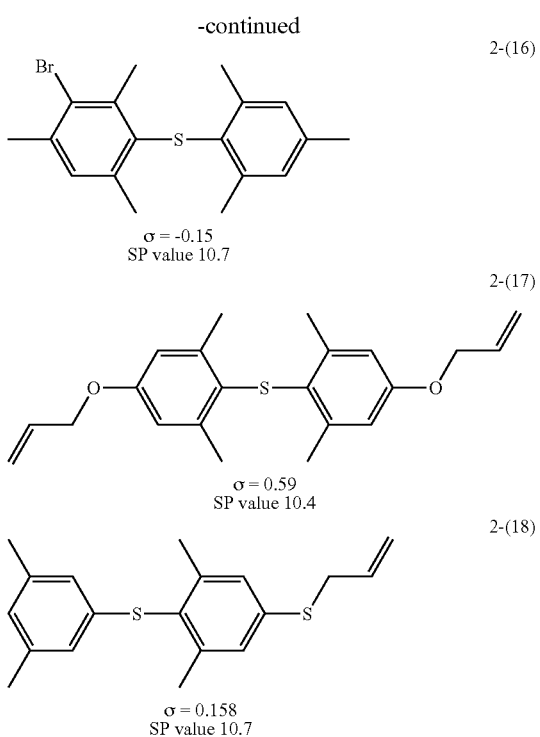

One dopant or two or more dopants may be used in the polymerizable composition of the second embodiment. It is necessary that all compounds used as a dopant are selected from the group consisting of the compounds having a benzene ring substituted by a substituent group having a Hammett value not greater than 0.04, or by substituents having an average of the Hammett values thereof not greater than 0.04 and a SP value of not greater than 10.9.

The desirable additional amount of the dopant may vary depending on increasing ability of refractive index and interaction with the polymer matrix. In general, the additional amount of the dopant is desirably from 1 to 30 wt %, more desirably from 3 to 25 wt % and much more desirably from 5 to 20 wt % with respect to the total of the polymerizable composition.

An optical member having a graded refractive index can be prepared by grading the concentration of the dopant while polymerization of the polymerizable composition of the first embodiment. One usable process for grading the dopant concentration is an interfacial gel polymerization process described later.

Preferable ranges of the amount of the components respectively may properly be determined in consideration of species to be employed, where the additional amount of the polymerization initiator is desirably within a range from 0.005 to 0.5 wt % and more desirably within a range from 0.010 to 0.50 wt % with respect to of the polymerizable monomer composition, and the additional amount of the chain transfer agent is desirably within a range from 0.10 to 0.40 wt % and more desirably within a range from 0.15 to 0.30 wt % of the monomer composition. The additional amount of the agent is desirably in a range from 1 to 30 wt % of the polymerizable monomer composition, and more desirably in a range from 1 to 25 wt %.

Another possible strategy relates to addition of other additives to the polymerizable composition to an extent not degrading the light transmission property. For example, an additive can be added in order to improve the weatherability or durability. It is also allowable to add an emission inductive material for amplifying light signal for the purpose of improving the light transmission property. Since even attenuated light signal can be amplified by addition of such compound to thereby elongate the length of transmission, the compound is typically applicable to produce a fiber amplifier at a part of light transmission link.

When heat and/or light is irradiated to the polymerizable composition, radicals and the like are generated from the polymerizable initiator, thereby inducing the polymerization of at least one polymerizable monomer. Since the polymerizable composition according to the second embodiment contains the dopant, the refractive-index-graded structure can readily be obtained by controlling the proceeding direction of the polymerization, typically by the interfacial gel polymerization process described later, so as to create a concentration gradient of the dopant, or so as to create a copolymerization ratio gradient of the dopant and the at least one polymerizable monomer. According to the second embodiment, for preventing absorption attributed to the fourth overtone of C—H stretching vibration in a benzene ring from influencing 850 nm light of a light source, the dopant improved so that the absorption is significantly shifted to longer wavelengths is used, and therefore, transmission loss due to the dopant can be lowered. Furthermore, from the viewpoint of the compatibility with the polymer matrix having an adequate hydrohobicity, by using the dopant having a SP value within a specific range, transmission loss is further lowered and moisture-heat-resistant property is improved. The polymer having a desired molecular weight can be obtained by adjusting a polymerization rate and/or degree with a polymerization initiator or a chain transfer agent which is occasionally added to the composition. When the polymerizable composition comprising a chain transfer agent is used, the molecular weight of the polymer can be adjusted by the chain transfer agent so as to be suitable in mechanical properties for drawing. Therefore, using such composition can also contribute to improvement in productivity when an optical fiber is prepared by drawing the preform produced by polymerization of the composition.

2. Optical Member

Examples processes for producing optical members with the polymerizable composition of the first or second embodiment will be described in detail. The examples described below are the examples in which the polymerizable composition of the first or second embodiment is used for producing a core region of graded-refractive-index optical member comprising the core region and a clad region.

GI type optical members can be produced by a process comprising a first step of preparing a hollow structure (for example a cylinder) corresponding to the clad region by carrying out polymerization of a polymerizable composition; a second step of preparing a preform which comprises regions respectively corresponding to the core region and the clad region by carrying out polymerization of a polymerizable composition of the first or second embodiment in the hollow portion of the structure; and a third step of processing the obtained preform into various forms.

A hollow structure (for example cylinder) made of a polymer is obtained through the first step. As typically described in International Patent Publication WO93/08488, a polymerizable composition is poured into a cylindrical polymerization vessel, and then polymerization is carried out while rotating (preferably while keeping the axis of the cylinder horizontally) the vessel, referred to as "a rotational polymerization" herein after, to thereby form a cylinder made of a polymer. At least one polymerization initiator, at least one transfer agent and if necessary, at least one additive such as a stabilizer can be poured into the vessel with at least polymerizable monomer. A suitable temperature and period for the polymerization may vary depending on species of the monomers to be employed. In general, the polymerization is preferably carried out at 60 to 90 degrees Celsius for 5 to 24 hours. The monomers used herein may be pre-polymerized before the polymerization so as to raise the viscosity thereof as described in JPA No. 1996-110419 (the term "JPA" as used herein means an "unexamined published Japanese patent application). Since the obtained hollow structure may be deformative when the vessel may get distorted by rotation, it is preferable to use a metal or glass vessel having a sufficient rigidity.

The major ingredient of the polymerizable monomer composition used in the first step is desirably same as that of the polymerizable monomer composition used in the second step. The ration and the minor ingredient thereof may be same or different.

When the polymerizable composition of the first embodiment is used in the second step, the usable polymerizable monomers used in the first step for forming the clad region are not specifically limited. Examples thereof include (meth) acrylates such as methyl methacrylate, t-butyl methacrylate, cyclohexyl methacrylate, tricyclo [$5.2.1.0^{2,6}$]decanyl methacrylate, adamantyl methacrylate, isobornyl methacrylate; and fluorinated (meth)acrylates such as 2,2,2-trifluoroethyl methacrylate, 2,2,3,3-tetrafluoropropyl methacrylate, 2,2,3, 3,3,-pentafluoropropyl methacrylate, 1-trifluoromethyl-2,2, 2-trifluoroethyl methacrylate, 2,2,3,3,4,4,5,5-octafluoropentyl methacrylate or 2,2,3,3,4,4-hexafluorobutyl methacrylate. One polymerizable monomer or two or more polymerizable monomers may be used in the first step. When two or more polymerizable monomers are used, the desirable ratio thereof may vary depending on types of the polymerizable monomers.

When the polymerizable composition of the second embodiment is used in the second step, the usable polymerizable monomers used in the first step for forming the clad region are not specifically limited. Usable examples thereof are same as those exemplified above. At least one compound selected from the group consisting of the formula (2) is desirably used in the first step.

Another material such as a polymerization initiator or a chain transfer agent used in the first step is not specifically limited, and may be selected from the various known materials depending on the polymerizable monomer used. The examples of such material are same as those exemplified for the first or second polymerizable compositions. In general, the desirable additional amount of the polymerization initiator may be in a range of 0.1 to 1.00 wt %, more desirably in a range of 0.40 to 0.60 wt %, of the monomer; and the desirable additional amount of the chain transfer agent may be in a range of 0.10 to 0.40 wt %, more desirably in a range of 0.15 to 0.30 wt %, of the monomer.

The hollow cylinder desirably has a bottom portion, so as that a material for the core region can be poured into the cylinder in the second step. The preferred material for the bottom portion is a material having a good affinity and adhesiveness with the polymer of the cylinder. The bottom portion may be formed of the same polymer as that of the cylinder. For example, the bottom portion can be produced by pouring a small amount of monomer into a vessel before or after carrying out rotational polymerization; and carrying out polymerization of the monomer with still standing the vessel.

For the purpose of completely reaction of the residual monomer or the residual polymerization initiator, it is allowable after such rotational polymerization to carry out annealing at a temperature higher than the polymerization temperature, or to remove non-polymerized components.

In the first step, it is also possible to produce the structure having a desired shape (cylindrical shape in this embodiment) by molding a polymer using known molding technique such as extrusion molding.

When the cylindrical structure is produced by molding and the polymerizable composition of the second embodiment is used in the second step, the examples of the polymers which can be used include polymers produced by polymerization of the second polymerizable composition, but not containing any dopants; polyvinylidene fluorides, fluorinated (meth)acrylate base polymers and amorphous polyolefins. The fluorinated polymers generally have a refractive index lower than that of the non-fluorinated polymers, and using such fluorinated polymers, the numerical aperture number is increased; however, the adhesion to the core region is sometimes lowered. In such case, to ensure the sufficient adhesion, an outer core layer may be formed between the core and clad regions, by polymerization of the second polymerizable composition, but not containing any dopants. The clad region and the outer core region may be produced at same time by molding techniques such as co-extrusion molding.

In the second step, the polymerizable composition of the first or second embodiment is poured into the hollow portion of the cylinder, which was obtained by the first step, corresponding to the clad region, and the polymerization of the monomer is carried out. When the outer core region was formed, the polymerizable monomer composition was poured into the hollow portion of the two-layered cylinder. From the view point of residues after polymerization, it is preferred to carry out the polymerization by a method based on the interfacial gel polymerization process which is solvent-free, disclosed in International Patent Publication No. WO93/08488. In the interfacial gel polymerization process, the polymerization of the polymerizable monomer proceeds along the radial direction of the cylinder from the inner wall thereof, of which viscosity is high, towards the center due to gel effect. When the polymerizable composition containing the dopant is used in the polymerization, the polymerization proceeds in a way such that the monomer having a higher affinity to the polymer of the cylinder predominantly exists on the inner wall of the cylinder and then polymerizes, so as to produce on the outer periphery a polymer having a lower content of the dopant. Ratio of the dopant in the resultant polymer increases towards the center. This successfully creates the distribution of the concentration of the dopant and thus introduces the distribution of refractive index within the region corresponding to a core region. And, when the dopant has a polymerizable group, the monomer having a higher affinity to the polymer of the cylinder predominantly exits on the inner wall of the cylinder and then polymerizes, so as to form a polymer having a low copolymerization ration of the dopant in the outside. The copolymerization ratio of the dopant in the resultant polymer increases towards the center. This successfully creates the distribution of the copolymerization ratio of the dopant, and thus introduces the distribution of refractive index within the region based on the graded copolymerization ratio corresponding to a core region.

Not only the distribution of refractive index is induced into the area corresponding to the core region through the second step, but also the distribution of thermal behavior since the areas having different refractive indices are also different in the thermal behavior. If the polymerization in the second step is carried out at a constant temperature, the response property against the volume shrinkage which occurs in the polymerization reaction process may vary depending on the thermal behaviors, and thereby air bubbles or micro-gaps may generate in the obtained preform, and drawing under heating of such preform may result in that the obtained fiber has a lot of air bubbles formed therein. If the polymerization in the second step is carried out at too low temperature, the productivity may considerably lower due to low polymerization efficiency, or the light transmission performance of the resultant optical member may lower due to incomplete polymerization. On the contrary, if the polymerization in the second step is carried out at too high initial polymerization temperature, the initial polymerization rate may be so fast that the volume shrinkage of the core region cannot be reduced by a relaxation response, and as a result a lot of air bubbles may generate in the core region. Therefore, it is preferable to carry out the polymerization at a proper temperature. When typical methacrylic esters are used as the monomer, the polymerization is desirably carried out at a temperature within a range from 50 to 150 degrees Celsius, more desirably at a temperature within a range from 80 to 120 degrees Celsius. It is also preferable to carry out the polymerization under inert gas atmosphere applied pressure in order to improve response property against the volume shrinkage which occurs in the polymerization. By dehydration or deaeration, it is possible to further reduce the degree of generating air bubbles.

(1) Using the First Polymerizable Composition:

The desirable polymerization temperature and polymerizable time may vary with the polymerizable monomers used. In general, the polymerization temperature is desirably from 60 to 90 degrees Celsius and the polymerization time is desirably from 5 to 24 hours. It is also desirable that a polymerization initiator having a ten-hour half-time decomposition temperature not lower than the boiling point of a polymerizable monomer is used, and the polymerization of the polymerizable monomer is carried out for 25% of the half-life period of the polymerization initiator. When the polymerization is carried out such conditions, it is possible to lower the initial polymerization rate, to improve the response property against the volume shrinkage, and thus, to reduce the degree of generating air bubbles in the preform due to the volume shrinkage and to increase the productivity. It is to be noted now that ten-hour, half-life decomposition temperature of the polymerization initiator means a temperature at that the polymerization initiator decomposes and reduces to the half amount for ten hours. When methyl methacrylate (MMA) is used as the polymerizable monomer, 2,2'-azobis(2-methylpropane) or 2,2'-azobis(2,4,4-trimethylpentane) can be selected from the above-listed polymerization initiators such that having ten-hour, half-life decomposition temperature not lower than the boiling point of MMA. When MMA is used as the polymerizable monomer and the later is used as the polymerization initiator, the polymerization is preferably allowed to proceed while keeping the initial polymerization temperature at 100 to 110 degrees Celsius for 48 to 72 hours, and further allowed to proceed at a temperature elevated to 120 to 140 degrees Celsius for 24 to 48 hours. When the former is used as the polymerization initiator, the polymerization is preferably allowed to proceed while keeping the initial polymerization temperature at 100 to 110 degrees Celsius for 4 to 24 hours, and further allowed to proceed at a temperature elevated to 120 to 140 degrees Celsius for 24 to 48 hours. The temperature elevation may be effected either in a step-wise manner or in a continuous manner, where shorter time for the elevation is preferable.

(2) When the Second Polymerizable Composition is Used:

The desirable conditions for polymerization of the second polymerizable composition containing at least alicyclic (meth)acrylate base monomer denoted by the formula (2) are same as those for polymerization of a polymerizable composition containing a typical (meth)acrylate. Therefore, the polymerization is desirably carried out at a temperature within a range from 50 to 150 degrees Celsius, more desirably at a temperature within a range from 80 to 120 degrees Celsius. It is also preferable to carry out the polymerization under inert gas atmosphere applied pressure in order to improve response property against the volume shrinkage which occurs in the polymerization. The polymerization is preferably allowed to proceed while keeping the initial polymerization temperature at 100 to 110 degrees Celsius for 4 to 24 hours, and further allowed to proceed at a temperature elevated to 120 to 140 degrees Celsius for 24 to 48 hours. Polymerization initiator may be selected depending on the polymerization temperature or polymerization time. When polymerization is carried out in the above mentioned condition, polymerization initiator is desirably selected from the group consisting of high-temperature decomposition type initiators such as di-tert-butyl peroxide (PBD) or 2,2'-azobis(2,4,4-trimethylpentane). The temperature elevation may be effected either in a step-wise manner or in a continuous manner, where shorter time for the elevation is preferable.

In the second step, it is preferable to carry out the polymerization under pressure (herein after referred as "pressurized polymerization"). In case of the pressurized polymerization, it is preferable to place the cylinder in the hollow space of a jig, and to carry out the polymerization while keeping the cylinder as being supported by the jig. While the pressurized polymerization is being carried out in a hollow portion of the structure corresponding to the clad region, the structure is kept as being inserted in the hollow space of the jig, and the jig prevents the shape of the structure from being deformed due to pressure. The jig is preferably shaped as having a hollow space in which the structure can be inserted, and the hollow space preferably has a profile similar to that of the structure. Since the structure corresponding to the clad region is formed in a cylindrical form in the present embodiment, it is preferable that also the jig has a cylindrical form. The jig can suppress deformation of the cylinder during the pressurized polymerization, and supports the cylinder so as to relax the shrinkage of the area corresponding to the core region with the progress of the pressurized polymerization. It is preferable that the jig has a hollow space having a diameter larger than the outer diameter of the mono-layered or double layered cylinder, and that the jig supports the cylinder corresponding to the clad region in a non-adhered manner. Since the jig has a cylindrical form in the present embodiment, the inner diameter of the jig is preferably larger by 0.1 to 40% than the outer diameter of the cylinder corresponding to the clad region, and more preferably larger by 10 to 20%.

The cylinder can be placed in a polymerization vessel while being inserted in the hollow space of the jig. In the polymerization vessel, it is preferable that the cylinder is housed so as to vertically align the height-wise direction thereof. After the cylinder is placed, while being supported by the jig, in the polymerization vessel, the polymerization vessel is pressurized. The pressurizing of the polymerization vessel is preferably carried out using an inert gas such as nitrogen, and thus the pressurized polymerization preferably is carried out under an inert gas atmosphere. While a preferable range of the pressure during the polymerization may vary with species of the monomer, it is generally 0.05 to 1.0 MPa or around.

A preform for the plastic optical member can be obtained through the first and second steps.

In the third step, a desired optical member can be obtained by processing the preform produced through above steps. For example, slicing the preform gives plate-shaped or column-shaped planar lens, and drawing under fusion gives plastic optical fiber.

Optical fibers can be produced by heat drawing in the third step. While the heating temperature during the drawing may properly be determined in consideration of source material of the preform, a generally preferable range thereof is 180 to 250 degrees Celsius. Conditions for the drawing (drawing temperature, etc.) may properly be determined in consideration of diameter of the obtained preform, desirable diameter of the plastic optical fiber, and source materials used. In particular for the optical fiber having a graded refractive index, the drawing spinning and heating should be carried out uniformly so as not to ruin the distribution profile of the refractive index which varies along the radial direction. It is therefore preferable to heat the preform using a cylindrical heating oven capable of uniformly heating it in the sectional direction thereof, and to draw the preform into fiber using a draw-spinning apparatus which has an aligning mechanism for keeping the center position constant. The drawing tension can be set to 10 g or above in order to orient molten plastic as described in JPA No. 1995-234322, and preferably set to 100 g or below so that strain does not remain after the spinning as disclosed in JPA No. 1995-234324. It is also allowable to employ a method having a pre-heating step prior to the drawing.

The plastic optical fiber after being processed in the third step can directly be subjected, without any modification, to various applications. The fiber may also be subjected to various applications in a form of having on the outer surface thereof a covering layer or fibrous layer, and/or in a form having a plurality of fibers bundled for the purpose of protection or reinforcement.

For the case where a coating is provided to the element wire, the covering process is such that running the element wire through a pair of opposing dies which has a through-hole for passing the element fiber, filling a molten polymer for the coating between the opposing dies, and moving the element fiber between the dies. The covering layer is preferably not fused with the element fiber in view of preventing the inner element fiber from being stressed by bending. In the covering process, the element fiber may be thermally damaged typically through contacting with the molten polymer. It is therefore preferable to set the moving speed of the element fiber so as to minimize the thermal damage, and to select a polymer for forming the covering layer which can be melted at a low temperature range. The thickness of the covering layer can be adjusted in consideration of fusing temperature of polymer for forming the covering layer, drawing speed of the element fiber, and cooling temperature of the covering layer.

Other known methods for forming the covering layer on the fiber include a method by which a monomer coated on the optical member is polymerized, a method of winding a sheet around, and a method of passing the optical member into a hollow pipe obtained by extrusion molding.

Coverage of the element fiber enables preparing of plastic optical fiber cable. Styles of the coverage include contact coverage in which plastic optical fiber is covered with a cover material so that the boundary of the both comes into close contact over the entire circumference; and loose coverage having a gap at the boundary of the cover material and plastic optical fiber. The contact coverage is generally preferable since the loose coverage tends to allow water to enter into the gap from the end of the cover layer when a part of the cover layer is peeled off typically at the coupling region with a connector, and to diffuse along the longitudinal direction thereof. The loose coverage in which the coverage and element fiber are not brought into close contact, however, is preferably used in some purposes since the cover layer can relieve most of damages such as stress or heat applied to the cable, and can thus reduce damages given on the element fiber. The diffusion of water from the end plane is avoidable by filling the gap with a fluid gel-form, semi-solid or powdery material. The coverage with higher performance will be obtained if the semi-solid or powdery material is provided with functions other than water diffusion preventive function, such as those improving heat resistance, mechanical properties and the like.

The loose coverage can be obtained by adjusting position of a head nipple of a crosshead die, and by controlling a decompression device so as to form the gap layer. The thickness of the gap layer can be adjusted by controlling the thickness of the nipple, or compressing/decompressing the gap layer.

It is further allowable to provide another cover layer (secondary cover layer) so as to surround the existing cover layer (primary cover layer). The secondary cover layer may be added with flame retarder, UV absorber, antioxidant, radical trapping agent, lubricant and so forth, which may be included also in the primary cover layer so far as a satisfactory level of the anti-moisture-permeability is ensured.

While there are known resins or additives containing bromine or other halogen or phosphorus as the flame retarder, those containing metal hydroxide are becoming a mainstream from the viewpoint of safety such as reduction in emission of toxic gas. The metal hydroxide has crystal water in the structure thereof and this makes it impossible to completely remove the adhered water in the production process, so that the flame-retardant coverage is preferably provided as an outer cover layer (secondary cover layer) surrounding the anti-moisture-permeability layer (primary cover layer) of the present invention.

It is still also allowable to stack cover layers having a plurality of functions. For example, besides flame retardation, it is allowable to provide a barrier layer for blocking moisture absorption by the element fiber or moisture absorbent for removing water, which is typified by hygroscopic tape or hygroscopic gel, within or between the cover layers. It is still also allowable to provide a flexible material layer for releasing stress under bending, a buffer material such as foaming layer, and a reinforcing layer for raising rigidity, all of which may be selected by purposes. Besides resin, a highly-elastic fiber (so-called tensile strength fiber) and/or a wire material such as highly-rigid metal wire are preferably added as a structural material to a thermoplastic resin, which reinforces the mechanical strength of the obtained cable.

Examples of the tensile strength fiber include aramid fiber, polyester fiber and polyamide fiber. Examples of the metal wire include stainless wire, zinc alloy wire and copper wire. Both of which are by no means limited to those described in the above. Any other protective armor such as metal tube, subsidiary wire for aerial cabling, and mechanisms for improving workability during wiring can be incorporated.

Types of the cable include collective cable having element fibers concentrically bundled; so-called tape conductor having element fibers linearly aligned therein; and collective cable further bundling them by press winding or wrapping sheath; all which can be properly selected depending on applications.

The optical member of the present invention is available as an optical fiber cable for use in a system for transmitting light signal, which system comprises various light-emitting element, light-receiving element, other optical fiber, optical bus, optical star coupler, light signal processing device, optical connector for connection and so forth. Any known technologies may be applicable while making reference to "Purasuchikku Oputicaru Faiba no Kiso to Jissai (Basics and Practice of Plastic Optical Fiber)", published by N.T.S. Co., Ltd.; optical bus typically described in JPA Nos. hei 10-123350, 2002-90571 and 2001-290055; optical branching/coupling device typically described in JPA Nos. 2001-74971, 2000-329962, 2001-74966, 2001-74968, 2001-318263 and 2001-311840; optical star coupler typically described in JPA No. 2000-241655; light signal transmission device and optical data bus system typically described in JPA Nos. 2002-62457, 2002-101044 and 2001-305395; light signal processor typically described in JPA No. 2002-23011; light signal cross-connection system typically described in JPA No. 2001-86537; optical transmission system typically described in JPA No. 2002-26815; and multi-function system typically described in JPA Nos. 2001-339554 and 2001-339555.

Outside of the above mentioned applications, the optical member of the present invention may be used in the various technical fields such as lighting systems, energy transmitters, illuminations or sensors.

EXAMPLES

The present invention will specifically be described referring to the specific examples. It is to be noted that any materials, reagents, ratio of use, operations and so forth can properly be altered without departing from the spirit of the present invention. The scope of the present invention is therefore by no means limited to the specific examples shown below.

Example 1-1

An amount of a mixture containing deuterated MMA (MMA-d8) as a polymerizable monomer, which was removed hydroquinone monomethyl ether as a polymerization inhibitor and reduced water content by not greater than 80 ppm, 0.5 wt %, with respect to the monomer weight, of benzoyl peroxide (BPO) as a polymerization initiator, and 0.28 wt %, with respect to the monomer weight, of n-laurylmercaptan as a chain transfer agent, was poured into a sufficiently-rigid cylindrical vessel having 22 mm in inner diameter and 600 mm in length, which inner diameter corresponds with the outer diameter of the preform to be obtained. The vessel was placed in the water bath at 80 degrees Celsius and the mixture was shaken and pre-polymerized at 80 degrees Celsius for 2 hours. Subsequently, the mixture was allowed to polymerize under heating at 80 degrees Celsius for 3 hours while holding the vessel horizontally and rotating it at a speed of rotation of 3,000 rpm, which was followed by annealing at 100 degrees Celsius for 24 hours, to thereby obtain hollow cylinder made of the polymer of MMA-d8.

Next, MMA-d8 as a polymerizable monomer, which was removed hydroquinone monomethyl ether as a polymerization inhibitor and was reduced water content by not greater than 80 ppm, and 10 wt %, with respect to the monomer weight, of a compound (13), (16) or (28) described above, or a compound (34), (35) or (36) as a comparative example described below, were mixed. The mixed solution was directly poured into the hollow region of the obtained hollow cylinder while being filtered through a membrane filter, based on tetrafluoroethylene, having a pore size of 0.2 μm. 0.016 wt %, with respect to the monomer weight, of PDB as a polymerization initiator and 0.27 wt %, with respect to the monomer mixture weight, of n-laurylmercaptan as a chain transfer agent were added to the mixed solution. The chain transfer constant of n-laurylmercaptan in this system was 0.8. A cylinder poured the mixed solution into was housed in a glass tube having a diameter larger by 9% than the outer diameter of the cylinder, and was then allowed to stand vertically in a pressure polymerization reactor. The inner atmosphere of the pressure polymerization reactor was then purged with nitrogen, pressurized up to 0.6 MPa, and the heat polymerization was allowed to proceed at 100 degrees Celsius for 48 hours and subsequently 120 degrees Celsius for 24 hours with keeping the pressured atmosphere to thereby obtain the preform.

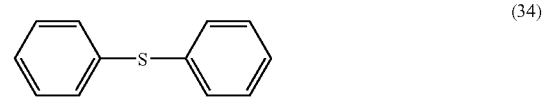

(34)

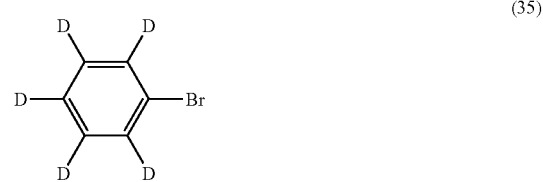

(35)

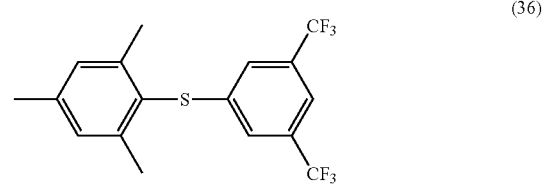

(36)

The obtained preform observed when the polymerization completed was found to have no air bubbles contained therein which possibly introduced by volume shrinkage. The preform was drawn by thermal drawing at 230 degrees Celsius so as to form a plastic optical fiber having a diameter of approx. 700 to 800 μm. The preform was not found to include air bubbles during the drawing, which contributed to successfully obtain the fiber of 300 m long in a stable manner.

The transmission loss for 850 nm light source and transmission band of each obtained optical fibers were shown in Table 1-1 with the Hammett value and the wavelength of the absorption peak attributed to the fourth overtone of benzene ring C—H stretching vibration of the dopant used in each optical fibers.

It is noted that the Hammett value of the compound (35) is a value when all C-D bonds are regarded as C—H bond, and since the wavelength of the absorption peak attributed to the fourth overtone of C—H stretching vibration can be substantially ignored at a deuteration rate of not lower than 99.5%, the Hammett value of the compound (35) is not shown in the Table 1-1.

To investigate Tg decrease due to these dopants, 10 wt % of each these dopants was added to MMA-d8, bulk polymerization of the MMA-d8 was carried out, and the Tg of each obtained bulk polymers was measured. The obtained Tg values are shown in Table 1-2.

Example 1-2

A mixture of MMA-d8, which was removed hydroquinone monomethyl ether as a polymerization inhibitor and reduced water content by not greater than 80 ppm as the above, and a fluorinated deuterated monomer, 3FM-d7 shown below, in which the weight ratio of the former to the later was 9:1, was used as a polymerizable monomer. The 8 wt % of a same dopant as used in the Example 1-1, i.e. compound (13), (16), (28), (35) or (36), was added to the monomer mixture. Except theses, optical fibers were produced in the same manner as the Example 1-1.

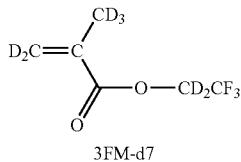

3FM-d7

The obtained preform observed when the polymerization completed was found to have no air bubbles contained therein which possibly introduced by volume shrinkage. The preform was drawn by thermal drawing at 230 degrees Celsius so as to form a plastic optical fiber having a diameter of approx. 700 to 800 μm. The preform was not found to include air bubbles during the drawing, which contributed to successfully obtain the fiber of 300 m long in a stable manner.

The transmission loss for 850 nm light source and transmission band of each obtained optical fibers were shown in Table 1-3 with the Hammett value of the dopant used in each optical fibers.

Example 1-3

A mixture of MMA-d8, which was removed hydroquinone monomethyl ether as a polymerization inhibitor and reduced water content by not greater than 80 ppm as the above, and a deuterated monomer, tBMA-d14 shown below, in which the weight ratio of the former to the later was 1:1, was used as a polymerizable monomer. The 10 wt % of a same dopant as used in the Example 1-1, i.e. compound (13), (16), (28), (35) or (36), was added to the monomer mixture. Except theses, optical fibers were produced in the same manner as the Example 1-1.

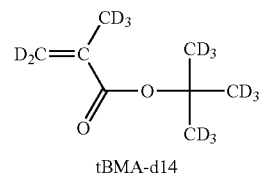

tBMA-d14

The obtained preform observed when the polymerization completed was found to have no air bubbles contained therein which possibly introduced by volume shrinkage. The preform was drawn by thermal drawing at 230 degrees Celsius so as to form a plastic optical fiber having a diameter of approx. 700 to 800 μm. The preform was not found to include air bubbles during the drawing, which contributed to successfully obtain the fiber of 300 m long in a stable manner.

The transmission loss for 850 nm light source and transmission band of each obtained optical fibers were shown in Table 1-4 with the Hammett value of the dopant used in each optical fibers.

TABLE 1-1

| Monomer | Dopant | Hammett value | Transmission loss [dB/km] | Transmission band [GHz/km] | Wavelength* [nm] |
|---|---|---|---|---|---|
| MMA-d8 | (13) | −0.073 | 99 | 1.0 | 880 |
| MMA-d8 | (16) | −0.28 | 97 | 1.0 | 883 |
| MMA-d8 | (28) | −0.17 | 102 | 1.0 | 882 |
| MMA-d8 | (34) | 0.134 | 400 | 1.0 | 873 |
| MMA-d8 | (35) | (0.294) | 100 | 0.7 | — |
| MMA-d8 | (36) | 0.578 | 720 | 0.7 | 867 |

*The wavelength of the absorption peak attributed to the fourth overtone of benzene ring C—H stretching vibration

TABLE 1-2

| Monomer | Dopant | Tg** [° C.] |
|---|---|---|
| MMA-d8 | (13) | 89 |
| MMA-d8 | (16) | 90 |
| MMA-d8 | (28) | 90 |
| MMA-d8 | (34) | 82 |
| MMA-d8 | (35) | 81 |
| MMA-d8 | (36) | 87 |

**Tg of the polymer containing 10 wt % of the dopant

TABLE 1-3

| Monomer | Dopant | Hammett value | Transmission loss [dB/km] |
|---|---|---|---|
| MMA-d8/3FM-d7 (9:1) | (13) | −0.073 | 98 |
| MMA-d8/3FM-d7 (9:1) | (16) | −0.28 | 102 |
| MMA-d8/3FM-d7 (9:1) | (28) | −0.17 | 100 |
| MMA-d8/3FM-d7 (9:1) | (34) | 0.134 | 405 |
| MMA-d8/3FM-d7 (9:1) | (35) | — | 101 |
| MMA-d8/3FM-d7 (9:1) | (36) | 0.578 | 751 |

TABLE 1-4

| Monomer | Dopant | Hammett value | Transmission Loss [dB/km] |
|---|---|---|---|
| MMA-d8/tBMA-d14 (1:1) | (13) | −0.073 | 101 |
| MMA-d8/tBMA-d14 (1:1) | (16) | −0.28 | 99 |
| MMA-d8/tBMA-d14 (1:1) | (28) | −0.17 | 99 |
| MMA-d8/tBMA-d14 (1:1) | (34) | 0.134 | 402 |
| MMA-d8/tBMA-d14 (1:1) | (35) | — | 98 |
| MMA-d8/tBMA-d14 (1:1) | (36) | 0.578 | 710 |

As shown in the Tables 1 to 4, it was found that when the compound (34) or (36), having the Hammett value greater than the specific value, i.e. 0.04, was used, the transmission loss at 850 nm was much greater than that of when the compound (35) was used; and when the compound (13), (16) or (28), having the Hammett value not greater than 0.04, was used, the optical fiber had a same level of that of the obtained optical fiber when the compound (35) was used.

It was also found that when the dopant of the present invention was used, in comparison with when the compound (35) was used, the broader transmission band was obtained with the same additional amount and the better heat resistant property was obtained due to the higher Tg of the polymer.

Example 2-1 and 2-2 and Comparative Example 2-1

An amount of a monomer mixture of deuterated methyl methacrylate, MMA-d8, and isobornyl methacrylate, IBXMA, both of them being removed hydroquinone monomethyl ether as a polymerization inhibitor and reduced water content by 80 ppm, and the MMA-d8 to IBXMA weight ratio being 4/1, was poured into a sufficiently-rigid cylindrical vessel having 22 mm in inner diameter and 600 mm in length, which inner diameter corresponds with the outer diameter of the preform to be obtained. And 0.5 wt %, with respect to the monomer mixture weight, of benzoyl peroxide (BPO) as a polymerization initiator and 0.28 wt %, with respect to the monomer mixture weight, of n-laurylmercaptan as a chain transfer agent were added to the monomer mixture. The vessel was placed in the water bath at 80 degrees Celsius and the mixture was shaken and pre-polymerized at 80 degrees Celsius for 2 hours. Subsequently, the mixture was allowed to polymerize under heating at 80 degrees Celsius for 3 hours while holding the vessel horizontally and rotating it at a speed of rotation of 3,000 rpm, which was followed by annealing at 100 degrees Celsius for 24 hours to thereby obtain hollow cylinder made of the copolymer of MMA-d8 and IBXMA.

Next, a monomer mixture of MMA-d8 and IBXMA, both of them being removed hydroquinone monomethyl ether as a polymerization inhibitor and reduced water content by not greater than 80 ppm, and the MMA-d8 to IBXMA weight ratio being 4/1; and 12.5 wt %, with respect to the monomer mixture weight, of a compound 2-(4) or 2-(6) described above or a comparative compound 2-(19) described below as a dopant were mixed, thereby to obtain a mixed solution. The mixed solution was directly poured into the hollow region of the obtained hollow cylinder while being filtered through a membrane filter, based on tetrafluoroethylene, having a pore size of 0.2 μm. 0.016 wt %, with respect to the monomer mixture weight, of PBD as a polymerization initiator and 0.27 wt %, with respect to the monomer mixture weight, of n-laurylmercaptan as a chain transfer agent were added to the mixed solution. The chain transfer constant of n-laurylmercaptan in this system was 0.8. A cylinder poured the mixed solution into was housed in a glass tube having a diameter larger by 9% than the outer diameter of the cylinder, and was then allowed to stand vertically in a pressure polymerization reactor. The inner atmosphere of the pressure polymerization reactor was then purged with nitrogen, pressurized up to 0.2 MPa, and the heat polymerization was allowed to proceed at 100 degrees Celsius for 48 hours and subsequently 120 degrees Celsius for 24 hours with keeping the pressured atmosphere to thereby obtain the preform.

Comparative Compound 2-(19)

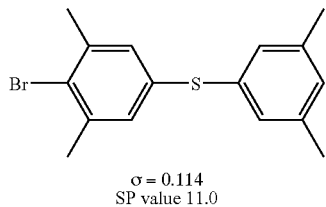

σ = 0.114
SP value 11.0

The obtained preform observed when the polymerization completed was found to have no air bubbles contained therein which possibly introduced by volume shrinkage. The preform was drawn by thermal drawing at 230 degrees Celsius so as to form a plastic optical fiber having a diameter of approx. 700 to 800 μm. The preform was not found to include air bubbles during the drawing, which contributed to successfully obtain the fiber of 300 m long in a stable manner.

The transmission loss for 850 nm light source of each obtained optical fibers was measured. And after being left under condition of that the temperature was 25 degrees Celsius and RH was 95%, the transmission loss for 850 nm light source of each obtained optical fibers was measured. The increase of transmission loss was shown in Table 2-1.

Example 2-3 and 2-4 and Comparative Example 2-2

A PVDF pipe, having an outside diameter of 20 mm, an inside diameter of 19 mm, a thickness of 0.5 mm and a length of 600 mm, was produced as a clad region by extrusion molding of poly-fluorine-vinylidene (PVDF), "KF-#850" manufactured by Kureha Chemical Industry, Co., Ltd.

A polymerizable composition containing a monomer mixture of deuterated methyl methacrylate, MMA-d8, and isobornyl methacrylate in which a methacrylate moiety was deuterated, IBXMA-d5, both of them being removed hydroquinone monomethyl ether as an polymerization inhibitor and reduced water content by 80 ppm, and the MMA-d8 to IBXMA-d5 weight ration was 7/3; 0.5 wt %, with respect to the monomer mixture weight, of BPO as a polymerization initiator and 0.28 wt %, with respect to the monomer mixture weight, of n-laurylmercaptan as a chain transfer agent; was directly poured into the hollow region of the obtained PVDF pipe while being filtered through a membrane filter, based on tetrafluoroethylene, having a pore size of 0.2 μm. The PVDF pipe poured the polymerizable composition into was placed in the water bath at 80 degrees Celsius and the polymerizable composition was shaken and pre-polymerized at 80 degrees Celsius for 2 hours. Subsequently, the pipe was held horizontally and rotated at a speed of rotation of 3,000 rpm, to carry out polymerization of the polymerizable composition at 80 degrees Celsius for 3 hours. After that, heat treatment was carried out at 100 degrees Celsius for 24 hours. Thus, an outer core region formed of the copolymer was produced.

Next, a monomer mixture of MMA-d8 and IBXMA-d5, both of them being removed hydroquinone monomethyl ether as a polymerization inhibitor and reduced water content by not greater than 80 ppm, and the MMA-d8 to IBXMA-d5 weight ratio was 7/3; and 12.5 wt %, with respect to the monomer mixture weight, of a compound 2-(4) or 2-(6) or comparative compound 2-(19) described above as a dopant were mixed, thereby to obtain a mixed solution. The mixed solution was directly poured into the hollow region of the obtained hollow cylinder while being filtered through a membrane filter, based on tetrafluoroethylene, having a pore size of 0.2 μm. 0.016 wt %, with respect to the monomer mixture weight, of PBD as a polymerization initiator and 0.27 wt %, with respect to the monomer mixture weight, of n-laurylmercaptan as a chain transfer agent were added to the mixed solution. The chain transfer constant of n-laurylmercaptan in this system was 0.8. A cylinder poured the mixed solution into was housed in a glass tube having a diameter larger by 9% than the outer diameter of the cylinder, and was then allowed to stand vertically in a pressure polymerization reactor. The inner atmosphere of the pressure polymerization reactor was then purged with nitrogen, pressurized up to 0.2 MPa, and the heat polymerization was allowed to proceed at 100 degrees Celsius for 48 hours and subsequently 120 degrees Celsius for 24 hours with keeping the pressured atmosphere to thereby obtain the preform.

The obtained preform observed when the polymerization completed was found to have no air bubbles contained therein which possibly introduced by volume shrinkage. The preform was drawn by thermal drawing at 230 degrees Celsius so as to form a plastic optical fiber having a diameter of approx. 500 μm. The preform was not found to include air bubbles during the drawing, which contributed to successfully obtain the fiber of 300 m long in a stable manner.

The transmission loss for 850 nm light source of each obtained optical fibers was measured. And after being left under condition of that the temperature was 25 degrees Celsius and RH was 95%, the transmission loss for 850 nm light source of each obtained optical fibers was measured. The increase of transmission loss was shown in Table 2-2.

Next, the outer surface of each obtained optical fibers in the Examples and the Comparative Examples was coated with polyethylene, thereby forming a primary coating layer having a thickness of 0.75 mm, and secondary coated with polyethylene containing 3% of carbon, thereby forming a secondary coating layer having a thickness of 0.75 mm. Bending tests were performed respectively for those. The bending tests were performed according to the method disclosed in JPA No. 1995-244220. Specifically, the coated fiber was given bending once by being wrapped by 90° around a mandrel having a 60 mm diameter, and the light transmission loss due to bending was measured. The maximum values of transmission loss due to bending were shown in Table 2-2.

TABLE 2-1

| | Dopant | Transmission Loss [dB/km] | Increase of transmission loss [dB/km] | Transmission loss due to bending [dB] |
|---|---|---|---|---|
| Example 2-1 | (4) | 510 | 290 | 0.7 |
| Example 2-2 | (6) | 495 | 280 | 0.7 |
| Comparative Example 2-1 | (19) | 770 | 350 | 1.0 |

TABLE 2-2

| | Dopant | Transmission Loss [dB/km] | Increase of transmission loss [dB/km] | Transmission loss due to bending [dB] |
|---|---|---|---|---|
| Example 2-3 | (4) | 420 | 220 | 0.05 |
| Example 2-4 | (6) | 405 | 210 | 0.05 |
| Comparative Example 2-2 | (19) | 680 | 270 | 0.07 |

As shown in the Table 2-1 and 2-2, it was found that when the dopant having the SP value greater than 10.9, i.e. the comparative compound (19), was used, both of the primary transmission loss and the increase of transmission loss after being left under the humidity and the heat; and when the compound 2-(4) or 2-(6) having the SP value not greater than 10.9, was used, the good results were obtained. It was also found that when the fiber was coated, the good result, such as low transmission loss caused by bending, was obtained as the above.

INDUSTRIAL APPLICABILITY

In one aspect, the present invention can provide a polymerizable composition capable of producing optical members for 850 nm wavelength and an optical member having low transmission loss at 850 nm with low cost.

In another aspect, the present invention can provide a polymerizable composition capable of producing optical members having low transmission loss at 850 nm and a good moisture-heat-resistant property and an optical member having a low transmission loss at 850 nm and a good moisture-heat-resistant property.

The invention claimed is:
1. A polymerizable composition for producing an optical member for 850 nm wavelength comprising:
   a polymerizable monomer composition,
   a polymerization initiator, and
   a compound, having a different refractive index from that of the polymerizable monomer composition, whose structure has a benzene ring substituted by a substituent having a Hammett value of not greater than −0.05 or by plural substituents having an average value of Hammett values thereof of not greater than −0.05.
2. The polymerizable composition of claim 1, wherein the polymerizable monomer composition comprises at least one selected from the group consisting of esters of a propenoic acid and esters of derivatives thereof in a major proportion.

3. The polymerizable composition of claim 2, wherein the polymerizable monomer composition comprises at least one selected from the group consisting of esters of a (meth) acrylic acid and esters of derivatives thereof in a major proportion.

4. The polymerizable composition of claim 1, wherein the polymerizable monomer composition comprises at least one selected from the group consisting of compounds including a C-F bond.

5. The polymerizable composition of claim 1, wherein the polymerizable monomer composition comprises at least one selected from the group consisting of compounds including a C-D (deuterium) bond.

6. An optical member produced by polymerization of a composition of claim 1, so as to form a region having a graded refractive index.

7. A process for producing an optical member comprising a step of polymerizing the polymerizable composition of claim 1.

8. The process of claim 7, wherein, in said step of polymerizing, the polymerization temperature is 50 degrees Celsius or above.

9. An optical member for 850 nm wavelength comprising:
a polymer composition comprising at least one polymer selected from the group consisting of (meth)acrylates base polymers and
a compound having a different refractive index from that of the polymer composition wherein the compound has an absorption peak attributed to a fourth overtone of C—H bond stretching vibration in a benzene ring at not shorter than 875 nm; and the compound's structure has a benzene ring substituted by a substituent having a Hammett value of not greater than −0.05 or by plural substituents having an average value of Hammett values thereof of not greater than −0.05.

10. The optical member of claim 9 wherein the compound is selected from the group consisting of:

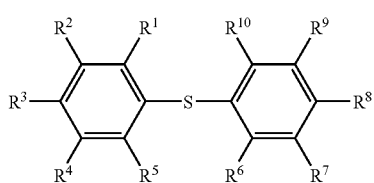

Formula (1)

wherein $R^1$ to $R^{10}$ respectively represent a hydrogen, an alkyl, an alkenyl, an alkyloxy, an alkenyloxy, or dialkylamino provided that at least four of them represent an alkyl, alkenyl, alkyloxy, alkenyloxy or dialkylamino.

11. The optical member of claim 9, which comprises a region having a graded refractive index.

12. The optical member of claim 11, which comprises a region having a graded refractive index along the direction from the center to the outside.

13. A polymerizable composition for producing an optical member comprising:
a polymerizable monomer composition comprising at least one selected from the group consisting of:

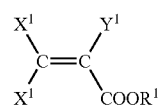

Formula (2)

wherein $X^1$ is hydrogen (H) or deuterium (D) wherein two $X^1$ may be the same or different; $Y^1$ represents H, D, $CH_3$ or $CD_3$; and $R^1$ represents a $C_{7-20}$ alicyclic hydrocarbon group;
a polymerization initiator, and
a compound, having a different refractive index from that of the polymerizable monomer composition and having a solubility parameter of not greater than 10.9, whose structure has a benzene ring substituted by a substituent having a Hammett value of not greater than −0.05 or by groups having an average value of Hammett values thereof of not greater than −0.05.

14. The polymerizable composition of claim 13 wherein the polymerizable monomer composition comprises an alicyclic hydrocarbon methyl methacrylate and methyl methacrylate in a major proportion.

15. The polymerizable composition of claim 14 wherein the polymerizable monomer composition comprises at least one compound including a C-D bond.

16. An optical member produced by polymerization of a composition of claim 13, so as to form a region having a graded refractive index.

17. The optical member of claim 16 comprising a core region having a graded refractive index, which is produced by polymerization of a composition of claim 11 and a clad region cladding the core region.

18. The optical member of claim 17, wherein the core region has a graded refractive index along the direction from the center to the outside.

19. The optical member of claim 17, wherein the clad region is essentially formed of a polymerizable monomer composition comprising a same ingredient or same ingredients in a major portion as those of the core region.

20. The optical member of claim 17 which is an optical fiber, a light guide or an optical lens.

* * * * *